United States Patent
Kushnikov et al.

(10) Patent No.: US 12,197,852 B1
(45) Date of Patent: Jan. 14, 2025

(54) UTILIZING A LARGE LANGUAGE MODEL TO GENERATE AN AUTOMATED COMMUNICATION FLOW

(71) Applicant: ManyChat, Inc., Palo Alto, CA (US)

(72) Inventors: Dmitrii Kushnikov, London (GB); Ilia Kolesnikov, Barcelona (ES); Mikael Yan, Palo Alto, CA (US); Nikolai Golov, Barcelona (ES)

(73) Assignee: ManyChat, Inc., Palo Alto, CA (US)

( * ) Notice: Subject to any disclaimer, the term of this patent is extended or adjusted under 35 U.S.C. 154(b) by 0 days.

(21) Appl. No.: 18/612,509

(22) Filed: Mar. 21, 2024

(51) Int. Cl.
*G06F 13/00* (2006.01)
*G06F 3/0482* (2013.01)
*G06F 40/186* (2020.01)
*H04L 51/00* (2022.01)

(52) U.S. Cl.
CPC .......... *G06F 40/186* (2020.01); *G06F 3/0482* (2013.01); *H04L 51/00* (2013.01)

(58) Field of Classification Search
CPC ..... G06F 40/186; G06F 3/0482; H04L 51/00; H04L 51/02; G06N 3/008; G06N 20/00
USPC ...... 706/45, 59; 709/206, 203; 715/762, 758
See application file for complete search history.

(56) References Cited

U.S. PATENT DOCUMENTS

| | | | | |
|---|---|---|---|---|
| 11,113,475 | B2 * | 9/2021 | Sampat | G06F 40/35 |
| 2020/0327196 | A1 * | 10/2020 | Sampat | G06N 20/00 |
| 2023/0297887 | A1 * | 9/2023 | Gurgu | G06N 20/00 706/12 |

* cited by examiner

*Primary Examiner* — Kenneth R Coulter
(74) *Attorney, Agent, or Firm* — Van Pelt, Yi & James LLP

(57) ABSTRACT

A natural language description of a desired function to be achieved using an automated communication flow is received. A prompt template specifically for a communication channel is selected based on an analysis of the natural language description of the desired function to be achieved. A prompt for a large language model is automatically generated based on the natural language description, including by inserting at least a portion of the selected prompt template in the automatically generated prompt. The automatically generated prompt is provided to the pre-trained large language model. Based on an output of the large language model, an automated communication flow to be implemented for the communication channel is automatically generated.

20 Claims, 29 Drawing Sheets

500

```
description: flow for quiz
config:
  nodes:
    - id: 1
      name: Welcome node
      blocks:
        - message: welcome text + intro about Quiz.
      quick_replies:
        - title: Let's start
          target_id: 2
    - id: 2
      name: Question 1
      blocks:
        - message: Text question 1
      quick_ replies:
        - title: Incorrect answer for question 1
          target_id: 3
        - title: Correct answer for question 1
          target_id: 4
        - title: Incorrect answer for question 1
          target_id: 3
    - id: 3
      name: Incorrect Answer
      blocks:
        - message: You answer incorrect. Correct answer is
      target_id: 5
    - id: 4
      name: Incorrect Answer
      blocks:
        - message: Correct!
```

```
        target_id: 5
    - id: 5
      name: Question 2
      blocks:
          - message: Text question 2
      quick_replies:
          - title: Incorrect answer for question 2
            target_id: 6
          - title: Correct answer for question 2
            target_id: 7
          - title: Incorrect answer for question 2
            target_id: 6
    - id: 6
      name: Incorrect Answer
      blocks:
          - message: You answer incorrect. Correct answer is
      target_id: 8
    - id: 7
      name: Incorrect Answer
      blocks:
          - message: Correct!
      target_id: 8
    - id: 8
      name: Quiz finished
      blocks:
          - message: Thanks message
```

Imagine that you are a marketer.
You shall create a conversation workflow for a chatbot.
Conversation workflow shall be described as a starting trigger and a set of Content Nodes.
Each Content Node represents a step of communication with user, showing him some messages, images, buttons to press, and asking some questions.

Conversation flow starts with a triggers block, describing how a user can enter the flow, beside triggers block conversation flow is a list of Content nodes.
Each triggers are of the following types:
- DM_KEYWORD - reaction to the user's direct message
- STORY_REPLY - reaction to the user's message in stories
- LIVE_COMMENT - reaction to a user's comment in live translation
- POST_COMMENT - reaction to a user's comment on a post or reels Here is format of structured document, describing the conversational flow.

triggers: #list of triggers, possibilities for a user to start conversational flow. One conversation flow can have multiple triggers.
  - type: #type of a trigger: "DM_KEYWORD", "STORY_REPLY", "LIVE_COMMENT" , "POST_COMMENT"
    keywords: #array of string, the trigger will trigger only if one of the string is contained in the user\ 's message
nodes: #List of Content nodes.
  - id: 1 #Each content Node shall have an unique ID.
    name: First node #Each content Node shall have an unique Name.
    blocks: #List of content blocks. Each content Node can include from 0 to 5 content blocks, each sending text message, or an image, or a gallery to the user. Can NEVER contain a question.
        - delay: #Each content block can have a delay after it.
        - cards: # content node of a gallery. shall contain any number of the cards, with the structure, described below

- title: Beautiful card #text, title of the correspondent card
    subtitle: Card with the picture of a ... #text, subtitle of the correspondent card
    image_url: https://example.com/image.jpg #URL of an image, which shall be shown inside a card
    keyboard: # optional field. from 0 to 3 buttons, which shall be shown below given card, each with the structure, described below:
    - button: "Ok" #Caption for correspondent button. Button, if clicked, shall either open URL or launch a Content Node
    target_id: 2 #ID of a Content node, which shall be launched , after the user will click correspondent button.
    url: https://example.com/MyPage.html #URL of a web-page, which shall be launched after user will click correspondent button
   - message: Hi, glad to see you! #content block, sending a text message
   - image: https://example.com/image.jpg #content block sending an image to the user
  target_id: 2 # first alternative option for parameter of Content Node, go to the next content node, without any conditions.
  quick_replies: # second alternative option for the last key of Content Node, show 1-3 quick reply buttons, each with hardcoded reply and ID of Content nodes to launch
   - title: "Text of answer" # Caption and the text of the message, which will be send from a user, after he will click correspondent quick reply
   target_id : 2 # ID of a Content node, which shall be launched next, after the user will click correspondent quick reply.
  input: # third alternative option for the last key of Content Node, ask the user to fill the input, to store an answer as a variable and go to the next Content Node.
   message: What do you want? #Nested parameter of an input, description of an input, expected from a user

FIG. 6 (Cont.)

600 field_id: gift_type #Nested parameter of an input, string ID of a variable, which can be used by other Content Nodes using {{cuf_gift_type}} for variable gift_ type.
      target_id: 2 #Nested parameter of an input, ID of the next Content Node to launch after user will fill this input Each Node must use one and only one of the parameters: target_id, quick_replies, input.
Each title must less 5 tokens.

Inside texts, you can use following default placeholders, as well as placeholders, created by inputs in Content nodes:
    Name of the buyer is available as a {{ig_username}} placeholder.
    Name of the company of the user is available as a {{instagram_account_name}} placeholder.

{{template}}

Use this structure of conversation workflow, replace only text fields based on user request.
For each user request, you must generate a response in the form of YAML described above, based on user description.
Output only just YAML of the conversation workflow, all texts in double quotes, no other texts please.

```
{
    "Business description": "I have tea shop",
    "Usecase": "use_case_collect_email",
    "Motivation collect emails": "to users who leave their email, I will send out news with discounts on products in the store",
    "Trigger": "STORY_REPLY"
}
```

{
    "role": "system",                            600

"content":"You are an experienced marketer. \nYou shall create a conversation workflow for a chatbot. \nConversation workflow shall be described as a starting trigger and a set of Content Nodes.\nEach Content Node represents a step of communication with user, showing him some messages, images, buttons to press, and asking some questions.\n\nHere is format of structured document, describing the conversational flow.\n\nYAML::=\ntriggers: #list of triggers, possibilities for a user to start conversational flow. One conversation flow can have multiple triggers. \n - type: #type of a trigger: \"DM_KEYWORD\", \"STORY_REPLY\", \"LIVE_COMMENT\", \"POST_COMMENT\"\n   keywords: #array of string, the trigger will trigger only if one of the string is contained in the user's message\nnodes: #List of Content nodes.\n - id: 1   #Each content Node shall have an unique ID. \n   name: First node #Each content Node shall have an unique Name.\n   blocks: #List of content blocks. Each content Node can include from 0 to 5 content blocks, each sending text message, or an image, or a gallery to the user. Can NEVER contain a question.\n   - delay: #Each content block can have a delay after it.\n     cards: # content node of a gallery. shall contain any number of the cards, with the structure, described below\n     - title: Beautiful card #text, title of the correspondent card\n       subtitle: Card with the picture of a ... #text, subtitle of the correspondent card\n       image_url: https://example.com/image.jpg #URL of an image, which shall be shown inside a card\n       keyboard: # optional field. from 0 to 3 buttons, which shall be shown below given card, each with the structure, described below:\n       button: \"Ok\" #Caption for correspondent button. Button, if clicked, shall either open URL or launch a Content Node\n       target_id: 2 #ID of a Content node, which shall be launched , after the user will click correspondent button. \n       url: https://example.com/MyPage.html #URL of a web-page, which shall be launched after user will click correspondent button\n   - message: Hi, glad to see you! #content block, sending a text message\n   - image: https://example.com/image.jpg #content block sending an image to the user\n   target_id: 2 # first alternative option for parameter of Content Node, go to the next content node, without any conditions.\n   quick_replies: # second alternative option for the last key of Content Node, show 1-3 quick reply buttons,

FIG. 7E each with hardcoded reply and ID of Content nodes to launch\n    - title: \ "Text of the quick reply\" # Caption and the text of the message, which will be send from a user, after he will click correspondent quick reply\n       target_id: 2 # ID of a Content node, which shall be launched next, after the user will click correspondent quick reply. \n    input: # third alternative option for the last key of Content Node, ask the user to fill the input, to store an answer as a variable and go to the next Content Node.\n      message: What do you want? #Nested parameter of an input, description of an input, expected from a user\n      field_id: gift_type #Nested parameter of an input, string ID of a variable, which can be used by other Content Nodes using {{cuf_gift_type}} for variable gift_type.\n      target_id: 2 #Nested parameter of an input, ID of the next Content Node to launch after user will fill this input\n\nEach Node must use one and only one of the parameters: target_id, quick_replies, input.\nEach title must less 5 tokens. \nAll texts in double quotes.\n\nInside texts, you can use following default placeholders, as well as placeholders, created by inputs in Content nodes:\n  Name of the buyer is available as a {{ig_username}} placeholder.\n  Name of the company of the user is available as a {{instagram_account_name}} placeholder. \n  \nFor each user request, you must generate a response in the form of YAML described above, based on user description. \nYou should output only YAML, no other texts."
  },
  {
    "role": "user", 704
    "content": "I have tea shop\nCreate quiz with 3 questions about kind of tea and promo code in the end"
  }

```
triggers:
  - type: DM_KEYWORD
    keywords: ["tea", "shop"]
nodes:
  - id: 1
    name: "Welcome node"
    blocks:
      - message: "Welcome to our tea shop! We have a special offer for you. If you leave your email, we will send you news with discounts on our products. Are you interested?"
        quick_replies:
          - title: "Yes, I'm interested"
            target_id: 2
          - title: "No, thank you"
            target_id: 3
  - id: 2
    name: "Collect Email"
    blocks:
      - message: "Great! Please leave your email address below so that we can send you the latest news and discounts."
        input:
          message: "Please enter your email address:"
          field_id: "email"
        target_id: 3
  - id: 3
    name: "Thanks"
    blocks:
      - message: "Thank you for providing your email address! We will keep you updated with our latest news and exclusive discounts. Have a great day!"
```

```
{
  "draft": {
    "root_content": "936fda65-94e9-49c9-8ce0-ffd14a58f6ba",
    "contents": [
      {
        "_oid": "936fda65-94e9-49c9-8ce0-ffd14a58f6ba",
        "type": "instagram",
        "caption": "Welcome node",
        "messages": [
          {
            "_oid": "e4cec8e1-53fd-42a1-b9c4-9e38afb4e122",
            "type": "text",
            "content": {
              "text": "Welcome to our tea shop! We have a special offer for you. If you leave your email, we will send you news with discounts on our products. Are you interested?"
            },
            "keyboard": []
          }
        ],
        "namespace": "content20231105212955_181818",
        "quick_replies": {
          "buttons": [
            {
              "caption": "Yes, I'm interested",
              "type": "content",
              "_content_oid": "aa3f17b7-410e-49f8-97c5-cba5dd561dbd"
            },
            {
              "caption": "No, thank you",
              "type": "content",
              "_content_oid": "d4460600-a74f-45be-b53e-772d98a42b7a"
            }
          ]
        }
      },
      {
        "_oid": "aa3f17b7-410e-49f8-97c5-cba5dd561dbd",
        "type": "instagram",
        "caption": "Collect Email",
        "messages": [
          {
            "_oid": "338805a9-80ff-4e12-91f1-2185d5a01f6d",
            "type": "text",
            "content": {
              "text": "Great! Please leave your email address below so that we can send you the latest news and discounts."
            },
            "keyboard": []
          },
```

```
{
    "_oid": "cb538b7c-0798-4071-b0a5-111225bacd8c",
    "type": "question",
    "content": {
        "text": "Please enter your email address:"
    },
    "answer_type": "text",
    "answer_method": "input",
    "adapters": [
        {
            "type": "save_answer_to_custom_field",
            "field_id": "email"
        }
    ],
    "keyboard": []
}
],
"namespace": "content20231105212955_181818",
"target": {
    "_content_oid": "d4460600-a74f-45be-b53e-772d98a42b7a"
}
},
{
    "_oid": "d4460600-a74f-45be-b53e-772d98a42b7a",
    "type": "instagram",
    "caption": "Thanks",
    "messages": [
        {
            "_oid": "253d5789-c8f9-4243-a586-2e0c3129a127",
            "type": "text",
            "content": {
                "text": "Thank you for providing your email address! We will keep you updated with our latest news and exclusive discounts. Have a great day!"
            },
            "keyboard": []
        }
```

```
      ],
      "namespace": "content20231105212955_181818"
    }
  ]
},
"fields": [
  "email"
],
"triggers": [
  "STORY_REPLY"
],
"flow_ns": "content20231105212955_181818",
"flow_id": 112233,
"session_id": "451aaaaa-2cfa-42e1-974b-0ec3c43c1e00",
"user_id": 1234567890,
"questionnaire": {
   "Business description": "I have tea shop",
   "Usecase": "use_case_collect_email",
   "Motivation collect emails": "to users who leave their email, I will send out news with discounts on products in the store",
   "Trigger": "STORY_REPLY"
},
"feature": "ai_flow_builder"
}
```

FIG. 7G (Cont.)

UTILIZING A LARGE LANGUAGE MODEL TO GENERATE AN AUTOMATED COMMUNICATION FLOW

BACKGROUND OF THE INVENTION

An enterprise selling products or services online may use one or more communications channels to communicate with prospective, current, and/or previous customers. For example, the enterprise may have a webpage, an online marketplace on a social media platform, send emails, send short message service (SMS) messages, use messaging applications, use social media platforms, etc. to communicate with prospective, current, and/or previous customers.

The enterprise may desire to communicate with prospective, current, and/or previous customers in a particular manner via the one or more communications channels. This requires a programmer to explicitly generate a communication flow for each of the one or more communication channels. A different communication flow may be required depending upon the customer segment with which the enterprise is communicating. As a result, the programmer may spend a lot of time and resources in generating the different communication flows for each customer segment for the enterprise.

BRIEF DESCRIPTION OF THE DRAWINGS

Various embodiments of the invention are disclosed in the following detailed description and the accompanying drawings.

FIG. 5 depicts an example of a prompt template in accordance with some embodiments.

FIG. 6 depicts an example of a prompt in accordance with some embodiments.

FIG. 7D is an example of a user request in accordance with some embodiments.

FIG. 7E is an example of a prompt in accordance with some embodiments.

FIG. 7F is an example of a large language model output in accordance with some embodiments.

FIG. 7G is an example of a post-processed large language model output in accordance with some embodiments.

DETAILED DESCRIPTION

Figure 1:
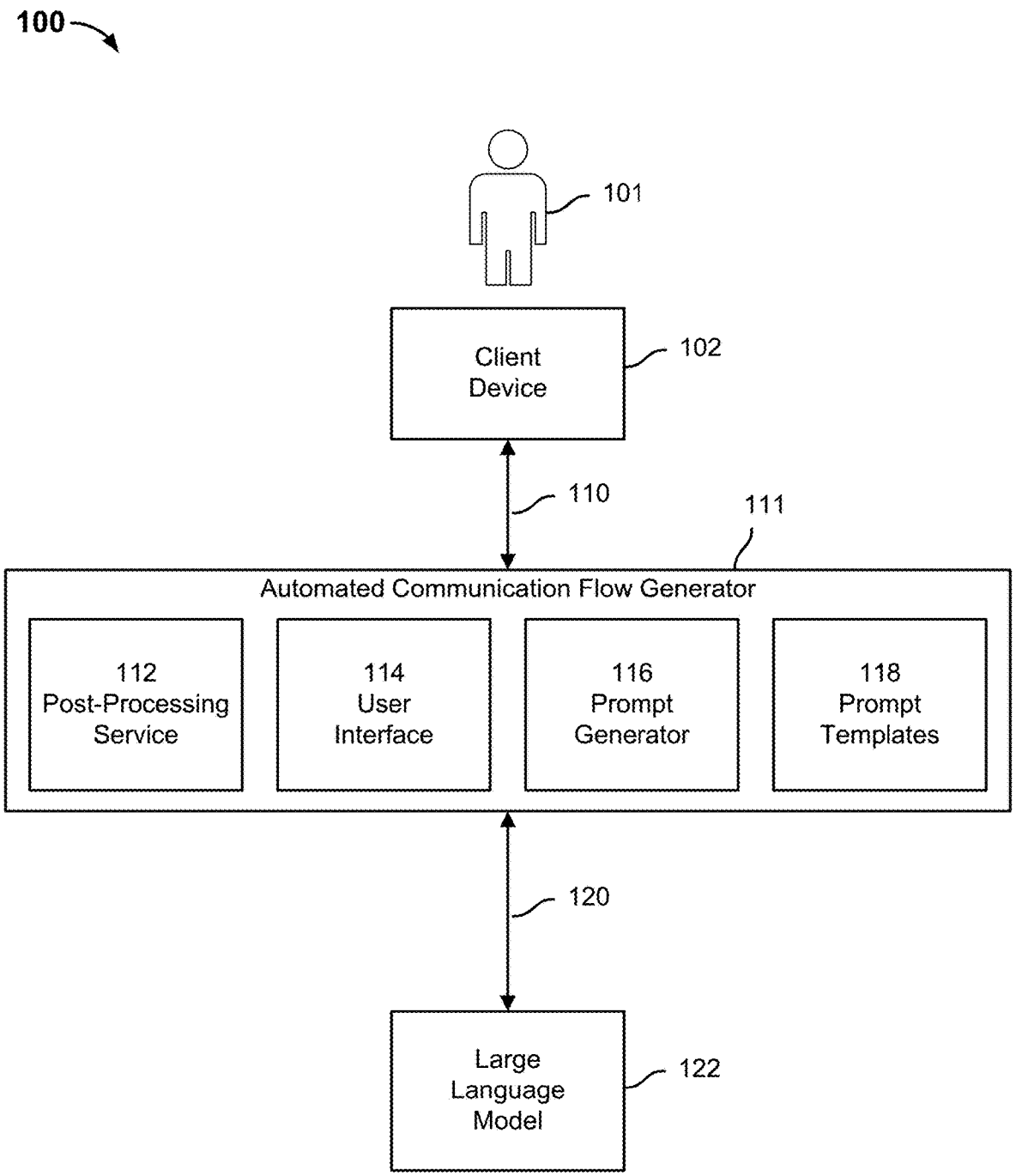
FIG. 1 is a block diagram illustrating an embodiment of a system to generate an automated communication flow utilizing a large language model in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique to automatically generate an automated communication flow to be implemented on a selected communication channel is disclosed. The disclosed technique reduces the amount of time and resources needed to generate an automated communication flow because a programmer does not need to program the automated communication flow for a selected communication channel. A large language model may be utilized by a user (e.g., a non-programmer) to generate an automated communication flow. The user may subsequently modify and finalize the automated communication flow via a user interface to generate the automated communication flow. This enables the user to generate the automated communication flow without knowing how to program.

However, the output of large language models is unpredictable. The quality of the large language model output is commensurate with the quality of the large language model input. Although a large language model may be used in place of a programmer, the large language model may not know how to generate the automated communication flow unless the user provides a well-informed input to the large language model. Many users do not know what to provide to a large language model to generate a quality automated communication flow for the communication flow. Thus, some users may be better off having a programmer spend the time and resources to generate the communication flow. The disclosed technique generates a well-informed input for a large language model, ensuring that the large language model outputs a quality automated communication flow without having a programmer explicitly program the automated communication flow.

A user interface is provided to a user. The user may select a communication channel for which the automated communication flow is to be generated. Examples of a communications channel include, but are not limited to, e-mail, short message service (SMS), multimedia messaging service (MMS), social media platforms (e.g., Facebook™ LinkedIn™, Instagram™, Snapchat™, X™ TikTok™, Threads™, etc.), messaging platforms (e.g., Whatsapp™, Facebook™ Messenger, Telegram, etc.), websites, website chat, etc. An identification of a selected communication channel among a plurality of different communication channels options is received.

A natural language description of a desired function to be achieved using the automated communication flow is received. In some embodiments, a prompt template specific for the selected communication channel is selected based on an analysis of the natural language description of the desired function to be achieved. A large language prompt generator stores a plurality of prompt templates for a plurality of different automated communication flow types. The large language prompt generator determines the automated communication flow type that best matches the natural language description of the desired function to be achieved and for the determined automated communication flow type, determines the prompt template specific for the selected communication channel. In other embodiments, a user interface displays a plurality of different automated communication flow types (e.g., share email, click on link, book an appointment, participate in a quiz, get a specific message, etc.). A prompt template may be selected based on a user selection of an automated communication flow type.

An automated communication flow includes one or more content nodes. A prompt template may indicate the content nodes to be included in an automated communication flow corresponding to the natural language description of the desired function to be achieved using the automated communication flow. The prompt template associates a content node with a corresponding identifier. The prompt template associates a content node with a corresponding name. The prompt template associates a content node with a corresponding placeholder message (e.g., "welcome text"). In some embodiments, the prompt template associates a content node with a corresponding motivation for the message (e.g., "motivation collect appointments"). In some embodiments, the prompt template associates a content node with one or more quick replies. For each quick reply, the prompt template may associate a quick reply with a corresponding placeholder title (e.g., "Incorrect answer for question 1" or "Correct answer for question 1") and a corresponding identifier of another content node that should proceed the content node, if selected, in the automated communication flow. In some embodiments, the prompt template associates a content node with an identifier associated with another content node that should proceed the content node in the automated communication flow. The prompt template may associate a content node with a corresponding field identifier. The prompt template may associate a content node with a placeholder URL (e.g., "https://example.com/"). The prompt template may associate a content node with a placeholder button.

A prompt for a large language model is automatically generated based on the selected prompt template and the natural language description of the desired function to be achieved using the automated communication flow. Examples of large language models include, but are not limited to, GPT-3, GPT-4, LLAMA, PaLM2, etc. The prompt includes one or more examples of an automated communication flow format that match the type of automated communication flow that is desired to be generated. The one or more automated communication flow format examples may correspond to the selected communication channel. The one or more examples provide rules for which the large language model is to follow. A large language model is configured to generate an output based on a received input. The output of the large language model is commensurate with the provided input (i.e., garbage in garbage out). The one or more examples of an automated communication flow format provided in the prompt provide a well-informed input to the large language model that enables it to generate an automated communication flow that accurately matches the automated communication flow type indicated in the request. In some embodiments, the prompt identifies one or more data-oriented formats in which the large language model output is to be generated (e.g., YAML, JSON, or any other human-readable data serialization language).

The automatically generated prompt is provided to the large language model. A structured description of the automated communication flow is received from the large language model. The received structured description (e.g., JSON) is an automated communication flow provided in a format (e.g., data-oriented format) that is based on the format example(s) included in the prompt template. The received structured description may indicate one or more triggers for the automated communication flow. The received structured description may indicate one or more types of triggers for the automated communication flow. The received structured description may indicate one or more keywords (e.g., "tea" or "shop") that trigger the automated communication flow. The received structured description may specify a particular message for a particular content node. The received output may specific a particular title (e.g., "Yes, I'm Interested" or "No, thank you") for a quick reply. The received structured description may associate a content node with a particular URL (e.g., the URL associated with an enterprise). The prompt template may associate a content node with a particular button.

The automated communication flow to be implemented for the selected communication channel is automatically generated based on an output of the language model, i.e., the received structured description of the automated communication flow. Post-processing is performed on the large language model output. Post-processing is performed on the large language model output by validating the large language model output.

The prompt requests the large language model to generate a simplified version of the automated communication flow (e.g., the structure of the automated communication flow). The prompt may request the large language model to generate a complex version of the automated communication flow (e.g., the structure and details of the automated communication flow), however, the large language model is prone to generating mistakes. As a result, a user would need to spend time and resources to debug the large language model output.

Validating the large language model output includes enriching the structured description of the automated communication flow with additional properties, such as a consistent set of globally unique identifiers, keys, default parameters, and encoding of names. Validating the large language model output also includes ensuring the position of the automated communication flow on the canvas.

Post-processing may optionally include translating the large language model output from a first data-oriented format to a second data-oriented format. A large language model may provide better results for some data-oriented formats than other data-oriented formats. However, it may be easier to implement the automated communication flow in a data-oriented format for which the large language model provides inferior results. Thus, the large language model output may need to be translated from a first data-oriented format to a second data-oriented format. The automated communication flow is a user interface (UI) representation of the structured description of the automated communication flow. The automated communication flow is provided via the UI utilizing the post-processed large language model output. The user may utilize a UI to modify and finalize the automated communication flow for the selected communication channel.

FIG. 1 is a block diagram illustrating an embodiment of a system to generate an automated communication flow utilizing a large language model in accordance with some embodiments. In the example shown, system 100 includes a client device 102 associated with a user 101. Client device 101 may be a computer, a laptop, a desktop, a tablet, a smartphone, a server, or any other computing device. Client device 101 is configured to communicate with prompt generator 111 via connection 110. Connection 110 may be a wired or wireless connection. Connection 110 may be the Internet, an intranet, a wireless local area network, a personal area network, a local area network, a campus area network, a metropolitan area network, a wide area network, or other type of network.

Automated communication flow generator 111 may be a server, computer, a virtual machine, a container, or any other type of computing device. In some embodiments, automated communication flow generator 111 is located in a cloud environment. In some embodiments, automated communication flow generator 111 is located on-prem. Automated communication flow generator 111 is configured to provide a user interface 114. User 101 may select, via client device 102, a communication channel for which an automated communication flow is to be generated. The communication channel may be selected via a drop down menu that lists the plurality of different communication channels. Subsequently, user 101 may provide, via client device 102, a natural language description of a desired function to be achieved using the automated communication flow.

In response to the natural language description, automated communication flow generator 111 is configured to select from prompt templates 118 a prompt template specific for the selected communication channel based on an analysis of the natural language description of the desired function to be achieved. Automated communication flow generator 111 stores in a storage (e.g., random access memory or read only memory) a plurality of prompt templates for a plurality of different automated communication flow types (e.g., different scenarios for different communication channels). Automated communication flow generator 111 is configured to determine the automated communication flow type that best matches the natural language description of the desired function to be achieved and for the determined automated communication flow type, determine the prompt template specific for the selected communication channel.

In other embodiments, user interface 114 displays a plurality of different automated communication flow types (e.g., share email, click on link, book an appointment, participate in a quiz, get a specific message, etc.). A prompt template may be selected based on a selection of an automated communication flow type by user 101.

An automated communication flow includes one or more content nodes. A prompt template may indicate the content nodes to be included in an automated communication flow corresponding to the natural language description of the desired function to be achieved using the automated communication flow. The prompt template associates a content node with a corresponding identifier. The prompt template associates a content node with a corresponding name. The prompt template associates a content node with a corresponding placeholder message. In some embodiments, the prompt template associates a content node with a corresponding motivation for the message. In some embodiments, the prompt template associates a content node with one or more quick replies. For each quick reply, the prompt template may associate a quick reply with a corresponding placeholder title and a corresponding identifier of another content node that should proceed the content node, if selected, in the automated communication flow. In some embodiments, the prompt template associates a content node with an identifier associated with another content node that should proceed the content node in the automated communication flow. The prompt template may associate a content node with a corresponding field identifier. The prompt template may associate a content node with a placeholder URL. The prompt template may associate a content node with a placeholder button.

Prompt generator 116 is configured to automatically generate a prompt for large language model 122 based on the natural language description of the desired function to be achieved and the prompt template. Large language model 122 is a large language model. Examples of large language models include, but are not limited to, GPT-3, GPT-4, LLAMA, PaLM2, etc. The prompt includes one or more examples of an automated communication flow format that match the type of automated communication flow that is desired to be generated. Large language model 122 is configured to generate an output based on a received input. The output of large language model 122 is commensurate with the provided input (i.e., garbage in garbage out). The one or more examples of an automated communication flow format provided in the prompt provide a well-informed input to large language model 122 that enables it to generate an automated communication flow that accurately matches the automated communication flow type indicated in the request. In some embodiments, the prompt identifies one or more data-oriented formats in which the large language model output is to be generated (e.g., YAML, JSON, or any other human-readable data serialization language).

The automatically generated prompt is provided to large language model 122 via connection 110. Connection 120 may be a wired or wireless connection. Connection 120 may be the Internet, an intranet, a wireless local area network, a personal area network, a local area network, a campus area network, a metropolitan area network, a wide area network, or other type of network. In some embodiments, large language model 122 is part of a system that includes automated communication flow generator 111 and the connection 120 is a bus or other communication system that transfers data between components inside a computer, or between computers.

Automated communication flow generator 111 is configured to receive an output from large language model 122. The received output is a structured description of an automated communication flow provided in a format (e.g., data-oriented format) that is based on the format example(s) included in the selected prompt template. The received structured description may indicate one or more triggers (e.g., any text message, special keyword, etc.) for the automated communication flow. The received structured description may indicate one or more types of triggers for the automated communication flow. The received structured description may indicate one or mor keywords that trigger the automated communication flow. The received output may specify a particular message for a particular content node. The received output may specific a particular title for a quick reply. The received structured description may associate a content node with a particular URL. The prompt template may associate a content node with a particular button.

Automated communication flow generator 111 is configured to automatically generate the automated communication flow to be implemented for the selected communication channel based on the structured description received from large language model 122.

Post-processing service 112 is configured to perform post-processing on the large language model output. Post-processing is performed on the large language model output by validating the large language model output. The prompt requests the large language model to generate a simplified version of the automated communication flow (e.g., the structure of the automated communication flow). The prompt may request the large language model to generate a complex version of the automated communication flow (e.g., the structure and details of the automated communication flow), however, the large language model is prone to generating mistakes. As a result, a user would need to spend time and resources to debug the large language model output.

Post-processing service 112 is configured to validate the large language model output by enriching the structured description of the automated communication flow with additional properties, such as a consistent set of globally unique identifiers, keys, default parameters, and encoding of names. Validating the large language model output also includes ensuring the position of the automated communication flow on the canvas.

Post-processing may optionally include translating the large language model output from a first data-oriented format to a second data-oriented format. A large language model may provide better automated communication flows (e.g., closely matches the natural description of the desired function) for some data-oriented formats than other data-oriented formats. However, it may be easier to implement the automated communication flow in a data-oriented format for which the large language model provides inferior results. Thus, the large language model output may need to be translated from a first data-oriented format to a second data-oriented format. The automated communication flow is provided via user interface 114 utilizing the post-processed large language model output. User 101 may utilize user interface 114 to modify and finalize the automated communication flow for the selected communication channel.

Figure 2:
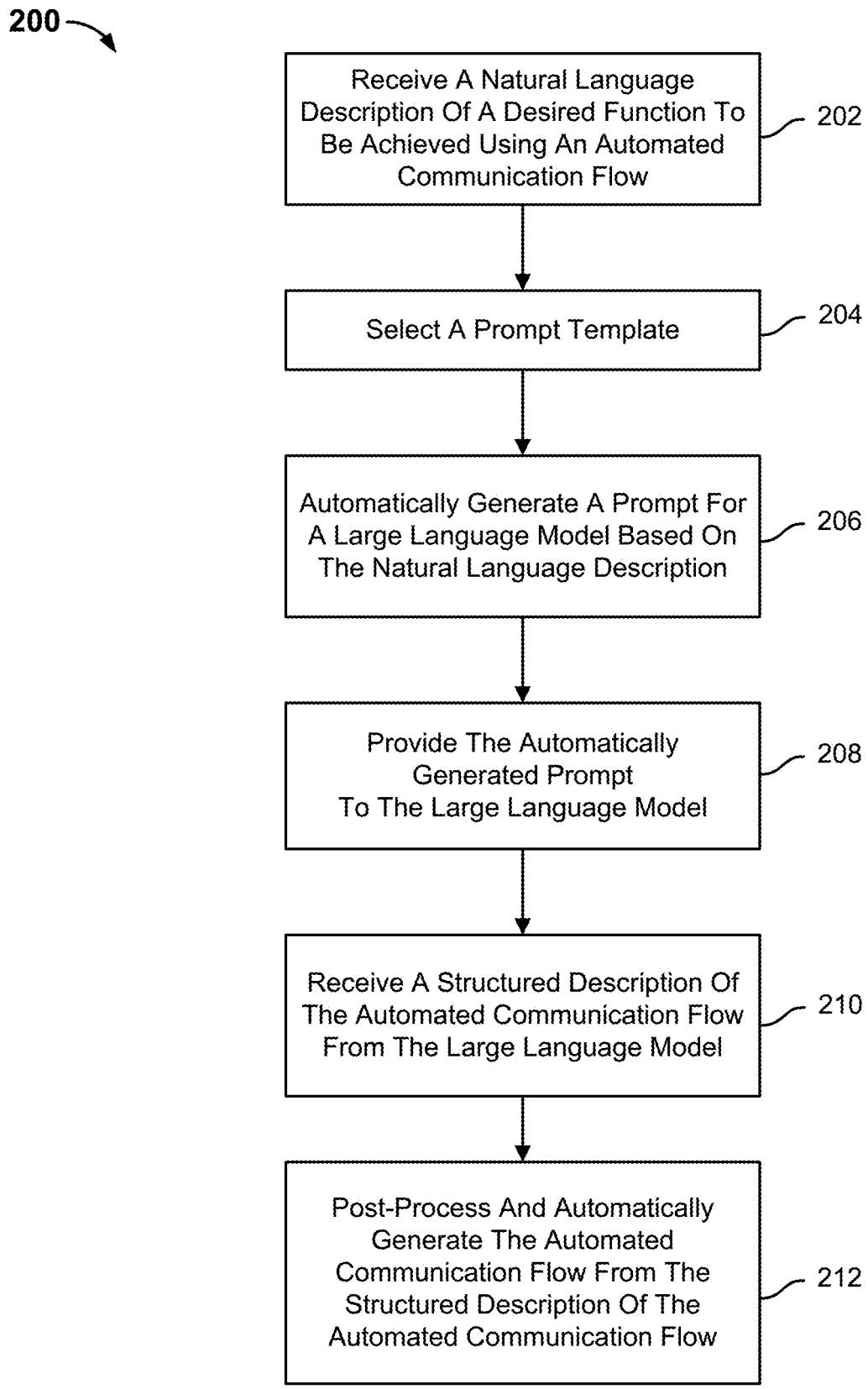
FIG. 2 is a block diagram illustrating an embodiment of a process to generate an automated communication flow utilizing a large language model in accordance with some embodiments.

FIG. 2 is a block diagram illustrating an embodiment of a process to generate an automated communication flow utilizing a large language model in accordance with some embodiments. In the example shown, process 200 may be implemented by an automated communication flow generator, such as automated communication flow generator 111.

At 202, a natural language description of a desired function to be achieved using the automated communication flow is received. The natural language description is received in one or more different languages that are supported by an LLM, such as English, Spanish, Portuguese, etc. The natural language description indicates a type of automated communication flow that the user wants to be generated. For example, the user associated with the client device may provide a natural language description of: "I have a coffee shop and I want to build a quiz about coffee with 3 questions and give a 10% discount to those who answer them."

At 204, a prompt template specific for the selected communication channel is selected based on an analysis of the natural language description of the desired function to be achieved. An automated communication flow generator stores a plurality of prompt templates for a plurality of different automated communication flow types. In some embodiments, the automated communication flow generator stores a plurality of prompt templates for an automated communication flow type. Different prompt templates corresponding to different communication channels may be stored for the same automated communication flow type. A prompt template may be associated with a corresponding scenario (e.g., appointment, collection subscriber emails, link to site, quiz, customer service, lead generation, lead follow-up, contact center automation, etc.).

The automated communication flow generator analyzes the request and selects a prompt template that best matches the type of automated communication flow indicated in the request. Natural language processing may be performed on the natural language description to determine the type of automated communication flow. A plurality of prompt templates for different types of automated communication flows are stored. The prompt template that matches the determined type of automated communication flow is selected. For example, natural language processing is performed on a natural language description of "I want to build a quiz about coffee with 3 questions and give a 10% discount to those who will answer them." The determined automated communication flow type is a quiz flow. A prompt template corresponding to the quiz flow is selected.

In other embodiments, a user interface displays a plurality of different automated communication flow types (e.g., share email, click on link, book an appointment, participate in a quiz, get a specific message, etc.). A prompt template may be selected based on a user selection of an automated communication flow type.

A prompt template is a description of the automated communication flow that is to be generated. An automated communication flow is comprised of one or more content nodes. A prompt template may indicate the content nodes to be included in an automated communication flow corresponding to the natural language description of the desired function to be achieved using the automated communication flow. The prompt template associates a content node with a corresponding identifier. The prompt template associates a content node with a corresponding name. The prompt template associates a content node with a corresponding placeholder message (e.g., "welcome text"). In some embodiments, the prompt template associates a content node with a corresponding motivation for the message (e.g., "motivation collect appointments"). In some embodiments, the prompt template associates a content node with one or more quick replies. For each quick reply, the prompt template may associate a quick reply with a corresponding placeholder title (e.g., "Incorrect answer for question 1" or "Correct answer for question 1") and a corresponding identifier of another content node that should proceed the content node, if selected, in the automated communication flow. In some embodiments, the prompt template associates a content node with an identifier associated with another content node that should proceed the content node in the automated communication flow. The prompt template may associate a content node with a corresponding field identifier. The prompt template may associate a content node with a placeholder URL (e.g., "https://example.com/"). The prompt template may associate a content node with a placeholder button. FIG. 5 depicts an example of a prompt template 600 in accordance with some embodiments.

At 206, a prompt for a large language model is automatically generated based on the natural language description and at least a portion of the selected prompt template in the automatically generated prompt. A prompt generator generates the prompt based on the selected template and the user request. FIG. 6 depicts an example of a prompt 600 in accordance with some embodiments.

The prompt may include a directive for a large language model that is to generate the automated communication flow. For example, the directive may be: "Imagine that you are a marketer. You shall create a conversation workflow for a chatbot. Conversation workflow shall be described as a starting trigger and a set of Content Nodes. Each Content Node represents a setup of communication with user, showing him some messages, images, buttons to press, and asking some questions."

The prompt includes one or more examples of an automated communication flow format that match the type of automated communication flow that is desired to be generated. A large language model is configured to generate an output based on a received input. The output of the large language model is commensurate with the provided input (i.e., garbage in garbage out). The one or more automated communication flow format examples included in the prompt provide a well-informed input to the large language model that enables it to generate an automated communication flow that accurately matches the automated communication flow type indicated in the request. In some embodiments, the prompt identifies one or more data-oriented formats in which the large language model output is to be generated (e.g., YAML, JSON, or any other human-readable data serialization language).

The automated communication flow includes one or more triggers that cause the automated communication flow to be triggered and a set of content nodes. The prompt indicates the one or more triggers that cause the automated communication flow to be triggered. Examples of a trigger include, without limitation, a user may react to a direct message on a social media application or webpage, react to a user's post or story on a social media application or webpage, react to a user's comment in a live post or story on a social media application or webpage, etc. In some embodiments, a trigger associated with an automated communication flow is triggered when a particular string is included in a message or response.

Each content node represents a step of communication in the automated communication flow. The prompt describes the content nodes that are to be included in the automated communication flow. A content node may provide a message to a user, provide an image to the user, provide a button for the user to press, and/or ask the user one or more questions. Each content node is associated with a unique identifier. In some embodiments, a content node is associated with a unique name. A content node may include 0-5 content blocks. A content block may send a text message, an image, or a gallery to a client device associated with a user. A content block may be associated with a delay. A content node may associated with a card. A card may have a structure that includes a title (e.g., beautiful card), a subtitle (e.g., card with a picture of . . . ), an image URL (e.g., https://example.com/image.jpg), and/or a keyboard (e.g., 0-3 buttons, which shall be show below a given card). A card may include a button. In some embodiments, the prompt template describes that a button, if clicked, shall either open an URL or launch a different content node.

The prompt may provide an example of a message to be included in a content node. The prompt may describe a plurality of parameters associated with a content node. The plurality of parameters may include a target id, a quick reply, or an input. In some embodiments, the prompt template indicates that a content node may utilize one of the plurality of parameters. The target id parameter indicates that the automated communication flow is to proceed to a next content node of the automated communication flow without any conditions.

The quick reply parameter indicates that the automated communication flow displays one or more reply buttons. Each of the one or more reply buttons is associated with a corresponding content node having a corresponding identifier. The prompt may indicate that the corresponding content node is to be launched in response to a selection a reply button.

The input parameter indicates that the automated communication flow requests the user to provide an input, store the response as a variable, and proceed to the next content node. The prompt template may indicate a message that is to be provided (e.g., "What do you want?"), a field identifier for the variable that can be used by other content nodes, and a target identifier that indicates a next content node that is to be launched after a user provides the input.

The prompt may provide boundaries for a title (e.g., less than 5 tokens). The prompt may provide formatting guidelines for text (e.g., all text in double quotes). The prompt template indicate the default placeholders to be included in the text (e.g., "Name of the buyer is available as a {{username}} placeholder" or "Name of the company of the user is available as a {{account_name}} placeholder).

The prompt may indicate the prompt template that is to be used to generate the automated communication flow.

The prompt may indicate a data-oriented format of a response that is to be provided based on the user description. For example, the prompt template may indicate that the response is to be generated in a data-oriented format, such as YAML, JSON, or any other human-readable serialization language).

At 208, the automatically generated prompt is provided to the large language model.

At 210, a structured description of the automated communication program flow is received from the large language model. The received output is an automated communication flow provided in a format based on the example included in the prompt template. The received output may indicate one or more triggers for the automated communication flow. The received output may indicate one or more types of triggers for the automated communication flow. The received output may indicate one or more keywords (e.g., "tea" or "shop") that trigger the automated communication flow. The received output may specify a particular message for a particular content node. The received output may specific a particular title (e.g., "Yes, I'm Interested" or "No, thank you") for a quick reply. The received output may associate a content node with a particular URL (e.g., the URL associated with an enterprise). The prompt template may associate a content node with a particular button.

At 212, the structured description of the automated communication flow is post-processed and the automated communication flow is automatically generated. Post-processing is performed on the large language model output by validating the large language model output. Validating the large language model output includes enriching the structured description of the automated communication flow with additional properties, such as a consistent set of globally unique identifiers, keys, default parameters, and encoding of names. Validating the large language model output also includes ensuring the position of the automated communication flow on the canvas.

Post-processing may optionally include translating the large language model output from a first data-oriented format to a second data-oriented format. A large language model may provide better results for some data-oriented formats than other data-oriented formats. However, it may be easier to implement the automated communication flow in a programming language for which the large language model provides inferior results. Thus, the—trained large language model output may need to be translated from a first data-oriented format to a second data-oriented format. The automated communication flow for the automated communication flow is provided via the user interface utilizing the post-processed large language model output. The user may utilize a user interface to modify and finalize the automated communication flow for the selected communication channel.

Figure 3A:
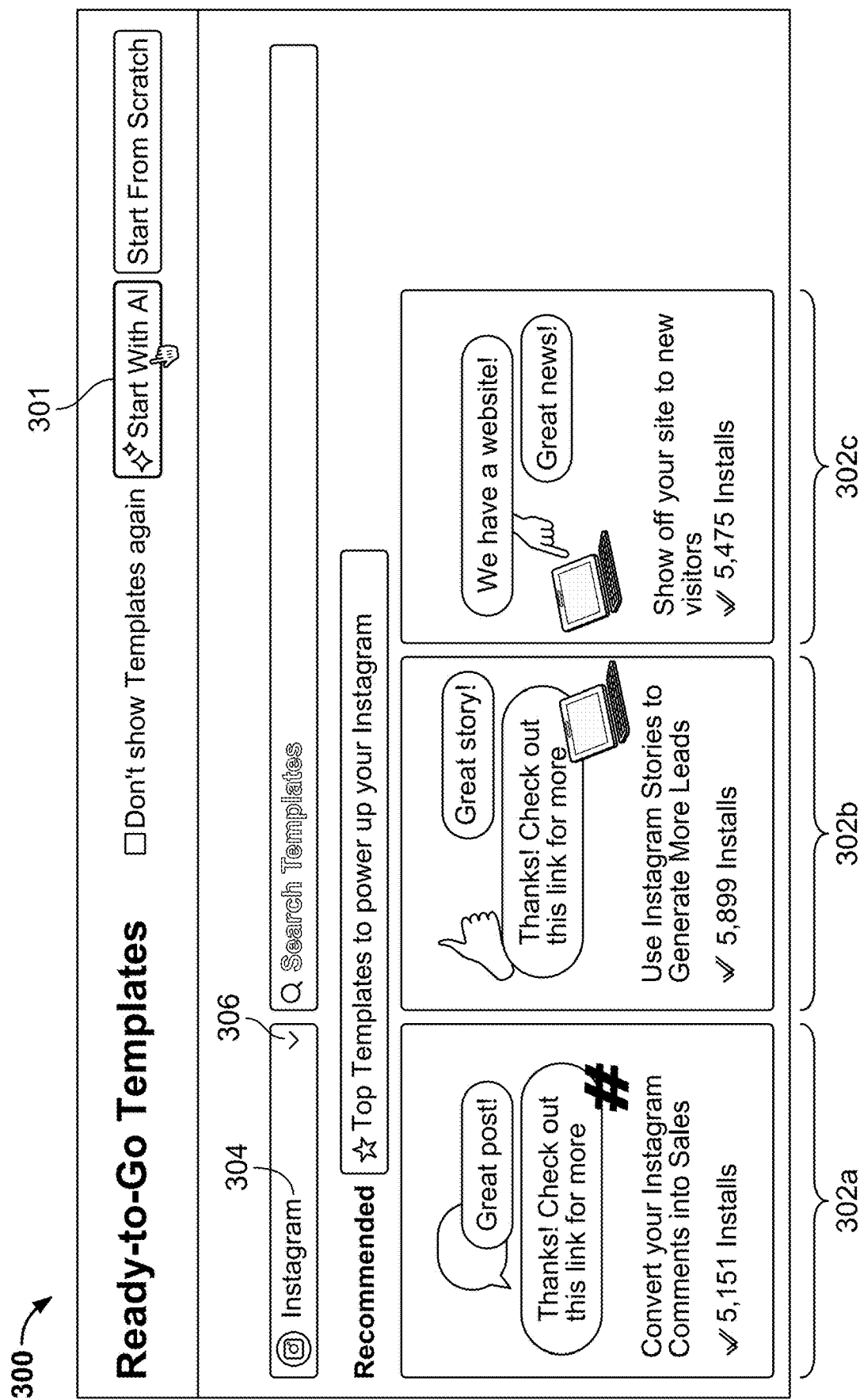
FIGS. 3A-3I are examples of a user interface in accordance with some embodiments.

FIG. 3A is an example of a user interface in accordance with some embodiments. In the example shown, user interface 300 includes button 301 that enables an automated communication flow to be generated via a large language model. User interface 300 indicates that the large language model may be utilized to generate the automated communication flow for a first scenario 302a, a second scenario 302b, or a third scenario 302c. The large language model may be utilized to generate an automated communication flow for n different scenarios. User interface 300 indicates the communication channel 304 for which the automated communication flow is to be generated. The communication channel 304 may be modified by selecting drop-down menu button 306 and selecting the communication channel for which the automated communication flow is to be generated.

Figure 3B:
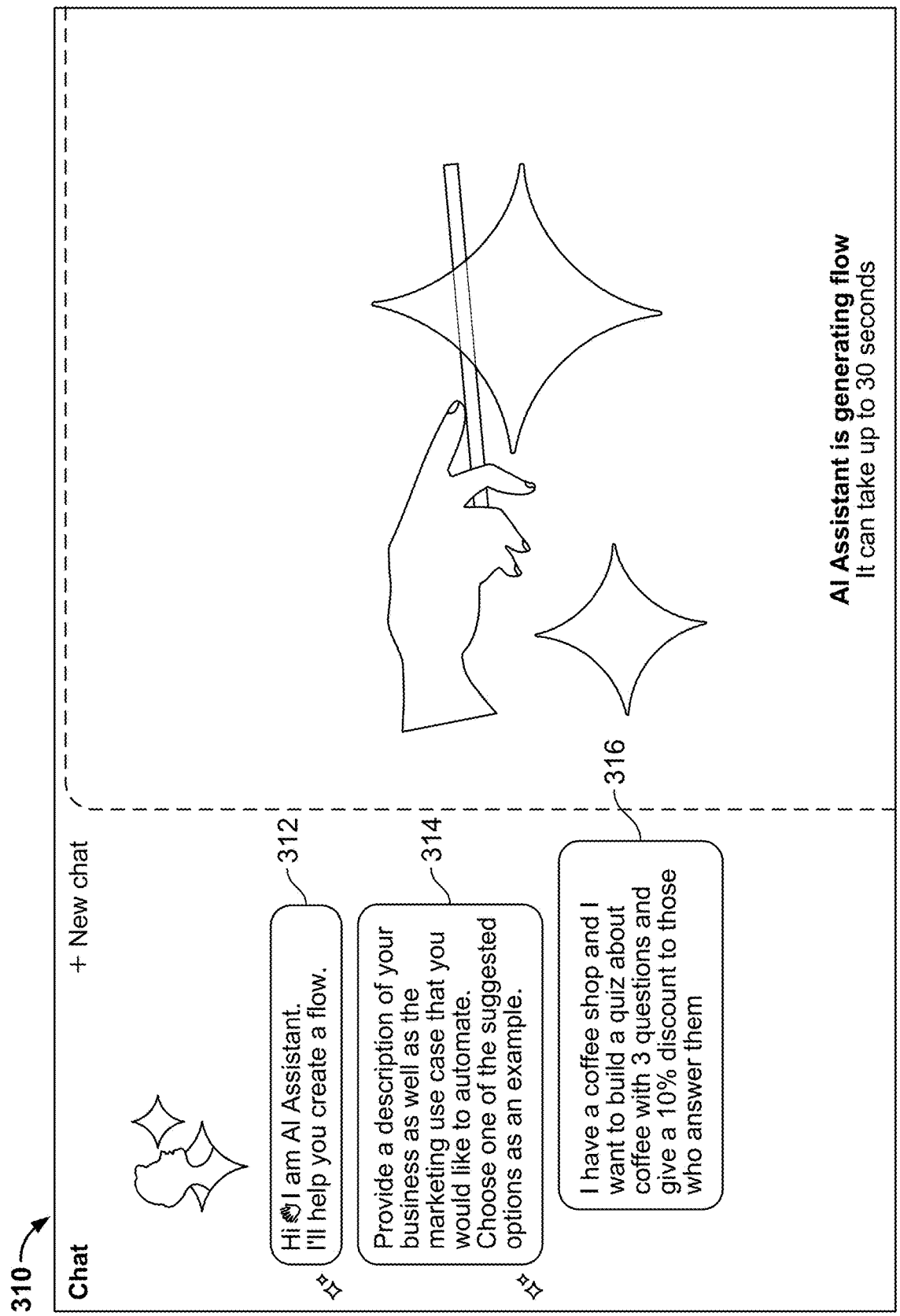

FIG. 3B is an example of a user interface in accordance with some embodiments. In the example shown, user interface 310 is provided responsive to a selection of button 301. User interface 310 includes chatbot interface that enables an AI assistant to communicate with a user. The AI assistant has provided messages 312, 314 to the user via user interface 310. In response, the user has provided user response 316 that includes a request indicating a type of automated communication flow that is to be generated.

Figure 3C:
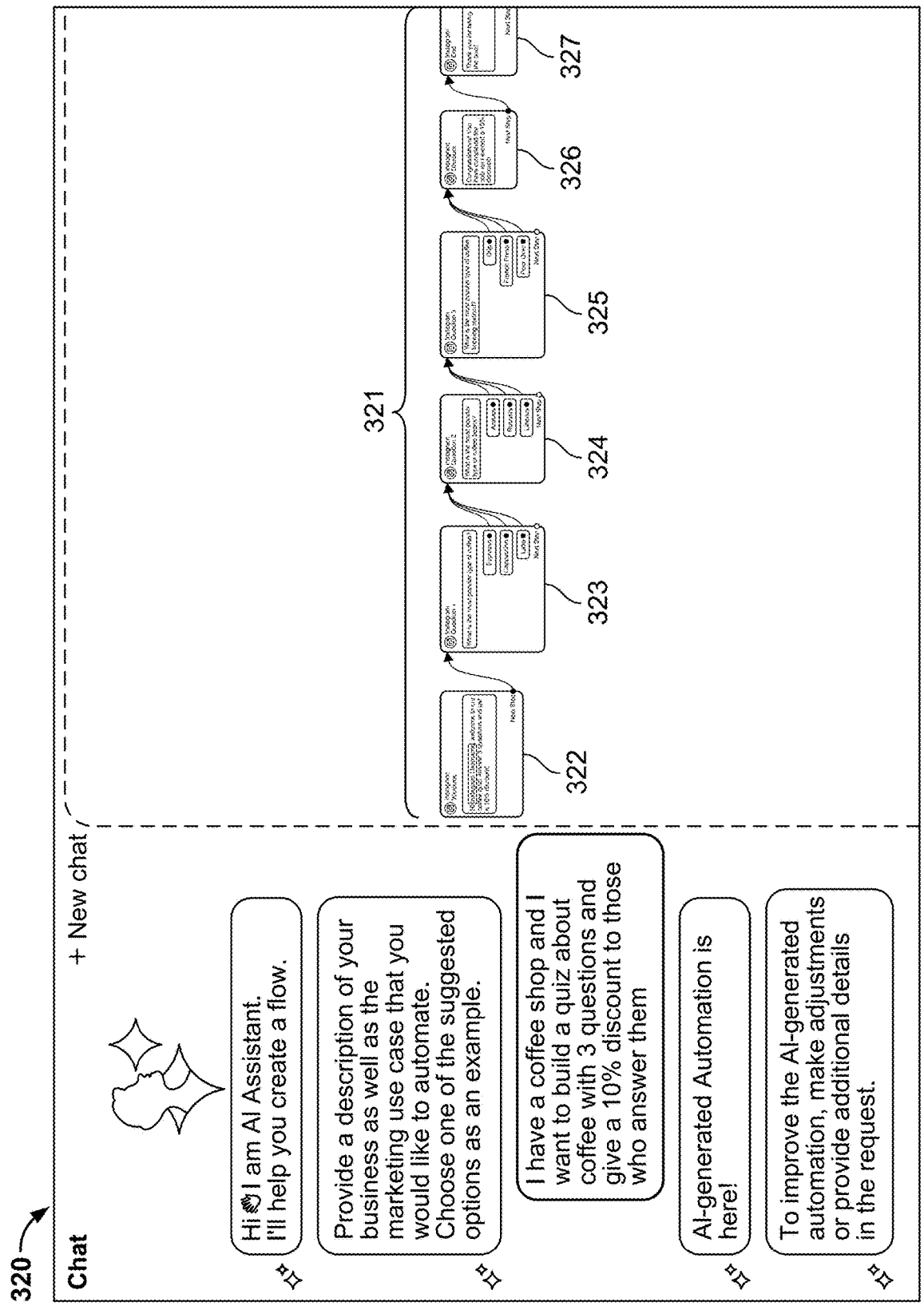

FIG. 3C is an example of a user interface in accordance with some embodiments. In the example shown, user interface 320 depicts an automated communication flow 321 generated based on the user request. Automated communication flow 321 includes content nodes 322, 323, 323, 324, 325, 326, 327. Automated communication flow 321 is generated based on a prompt provided to a large language model. The prompt includes the user request and at least a portion of a prompt template corresponding to a user request. The prompt template includes one or more examples of an automated communication flow format that is to be generated.

Figure 3D:
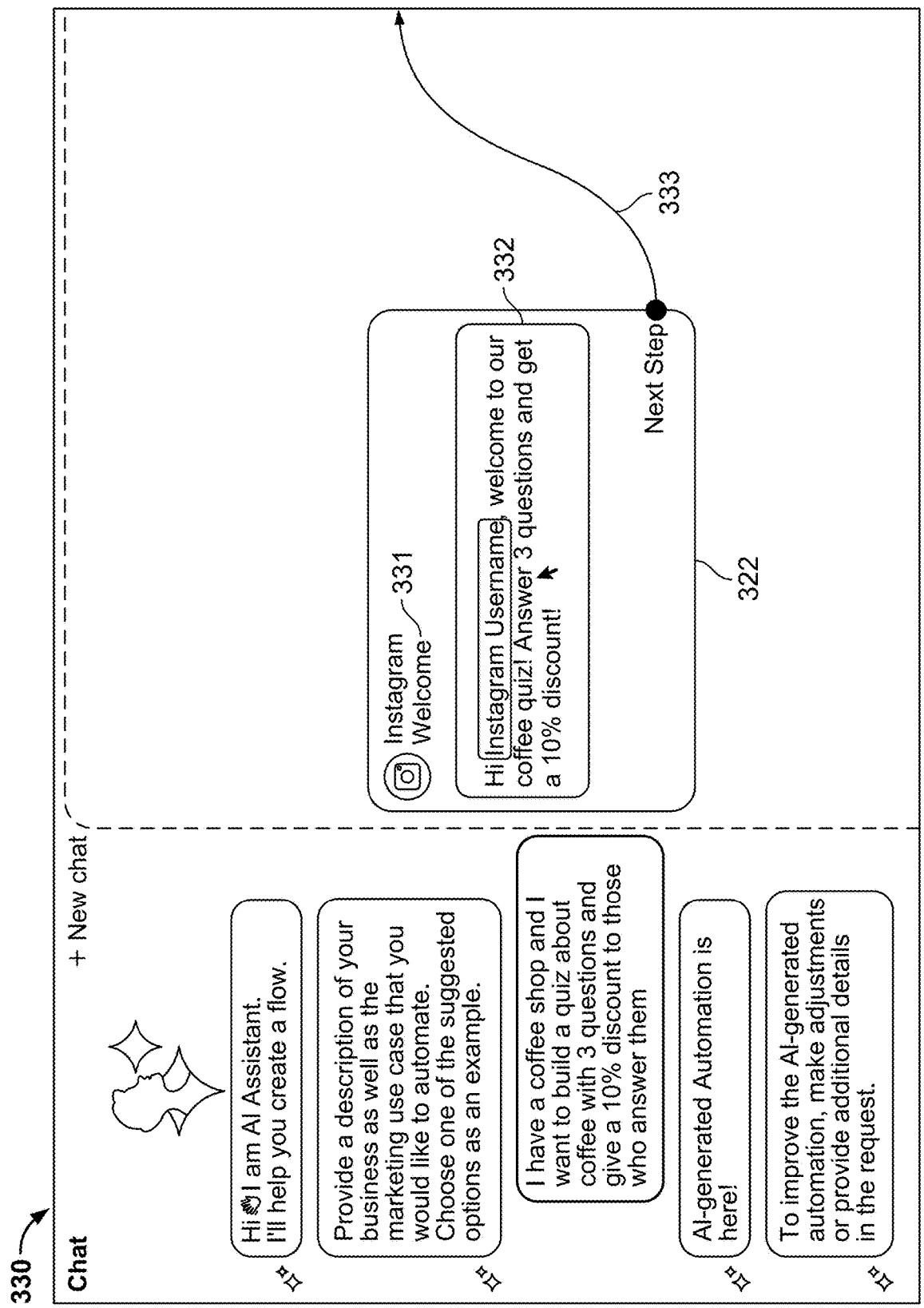

FIG. 3D is an example of a user interface in accordance with some embodiments. In the example shown, user interface 330 depicts content node 322. Content node 322 includes a title 331 and a message 332. Title 331 and message 332 are generated based on user response 316 and a prompt template selected based on an analysis of user response 316. Content node 322 includes a link 332 to content node 323. The target id parameter associated with content node 322 indicates that the automated communication flow is to proceed to the next content node of automated communication flow 321 without any conditions.

Figure 3E:
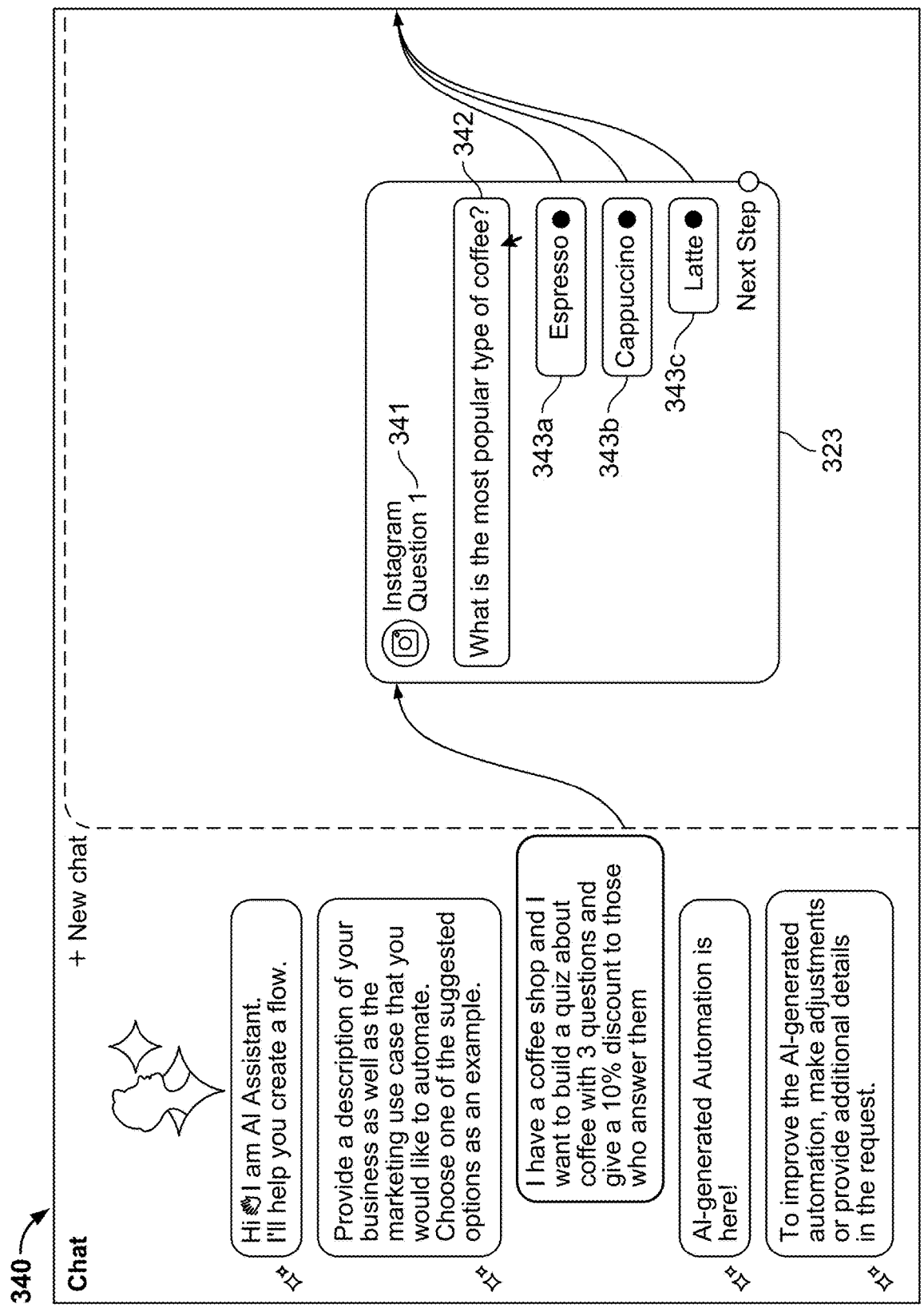

FIG. 3E is an example of a user interface in accordance with some embodiments. In the example shown, user interface 340 depicts content node 323. Content node 323 includes a title 341 and a message 342. Title 341 and message 342 are generated based on user response 316 and a prompt template selected based on an analysis of user response 316.

Content node 323 includes reply button 343a, reply button 343b, and reply button 343c. In response to a selection of reply button 343a, reply button 343b, or reply button 343c, the automated communication flow 321 proceeds to content node 324. In other embodiments, a selection of one of the reply buttons 343a, 343b, 343b causes automated communication flow 321 to proceed to a different content node (not shown). The large language model determined that reply buttons 343a, 343b, 343b should proceed to content node 324 based on user response 316 and the provided template.

Figure 3F:
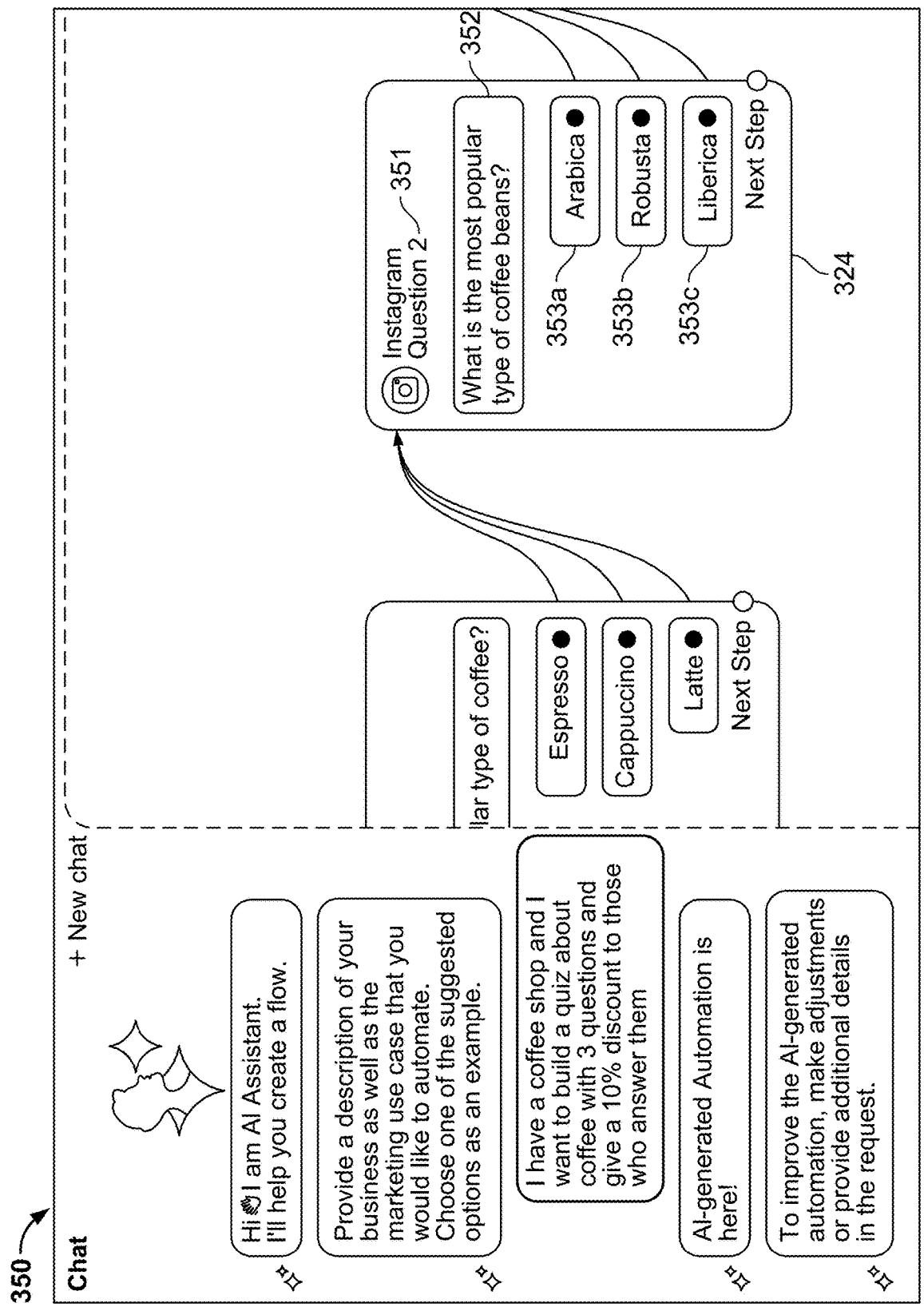

FIG. 3F is an example of a user interface in accordance with some embodiments. In the example shown, user interface 350 depicts content node 324. Content node 324 includes a title 351 and a message 352. Title 351 and message 352 are generated based on user response 316 and a prompt template selected based on an analysis of user response 316.

Content node 324 includes reply button 353a, reply button 353b, and reply button 353c. In response to a selection of reply button 353a, reply button 353b, or reply button 353c, the automated communication flow 321 proceeds to content node 325. In other embodiments, a selection of one of the reply buttons 353a, 353b, 353b causes automated communication flow 321 to proceed to a different content node (not shown). The large language model determined that reply buttons 353a, 353b, 353b should proceed to content node 325 based on user response 316 and the provided template.

Figure 3G:
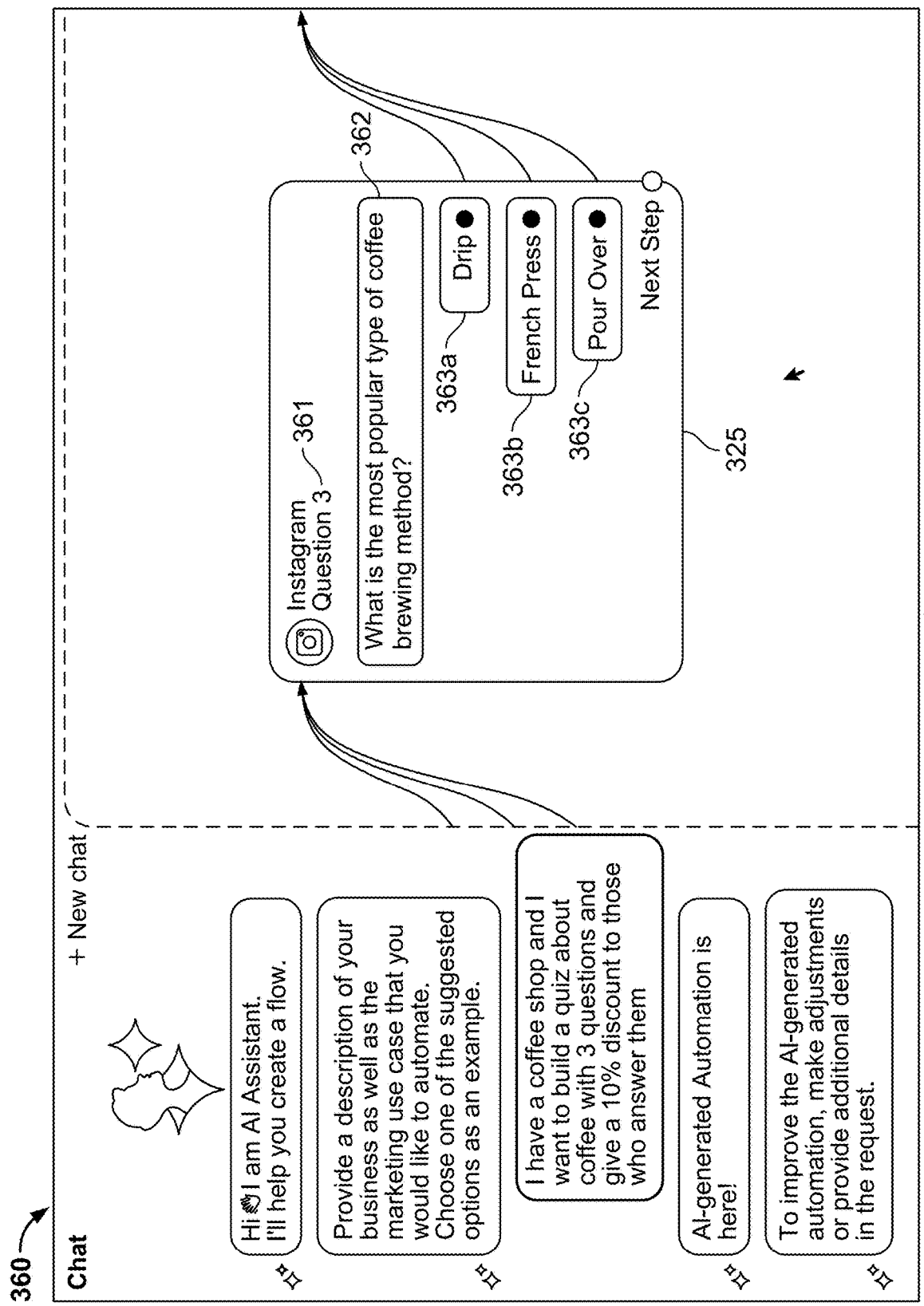

FIG. 3G is an example of a user interface in accordance with some embodiments. In the example shown, user interface 360 depicts content node 325. Content node 325 includes a title 361 and a message 362. Title 361 and message 362 are generated based on user response 316 and a prompt template selected based on an analysis of user response 316.

Content node 325 includes reply button 363a, reply button 363b, and reply button 363c. In response to a selection of reply button 363a, reply button 363b, or reply button 363c, the automated communication flow 321 proceeds to content node 326. In other embodiments, a selection of one of the reply buttons 363a, 363b, 363b causes automated communication flow 321 to proceed to a different content node (not shown). The large language model determined that reply buttons 363a, 363b, 363b should proceed to content node 326 based on user response 316 and the provided template.

Figure 3H:
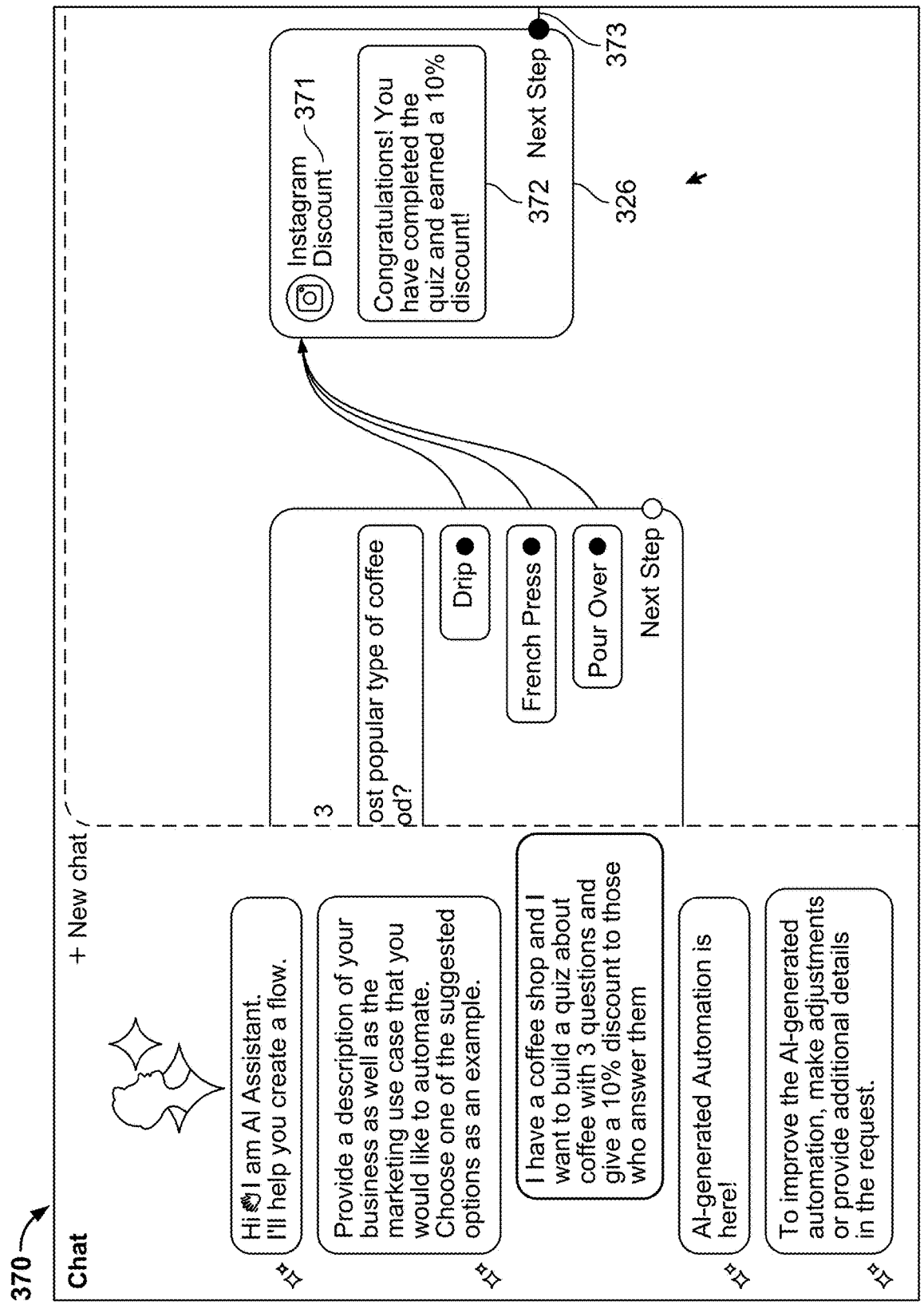

FIG. 3H is an example of a user interface in accordance with some embodiments. In the example shown, user interface 370 depicts content node 326. Content node 326 includes a title 371 and a message 372. Title 371 and message 372 are generated based on user response 316 and a prompt template selected based on an analysis of user response 316. Content node 326 includes a link 373 to content node 327. The target id parameter associated with content node 326 indicates that the automated communication flow is to proceed to the next content node of automated communication flow 321 without any conditions.

Figure 3I:
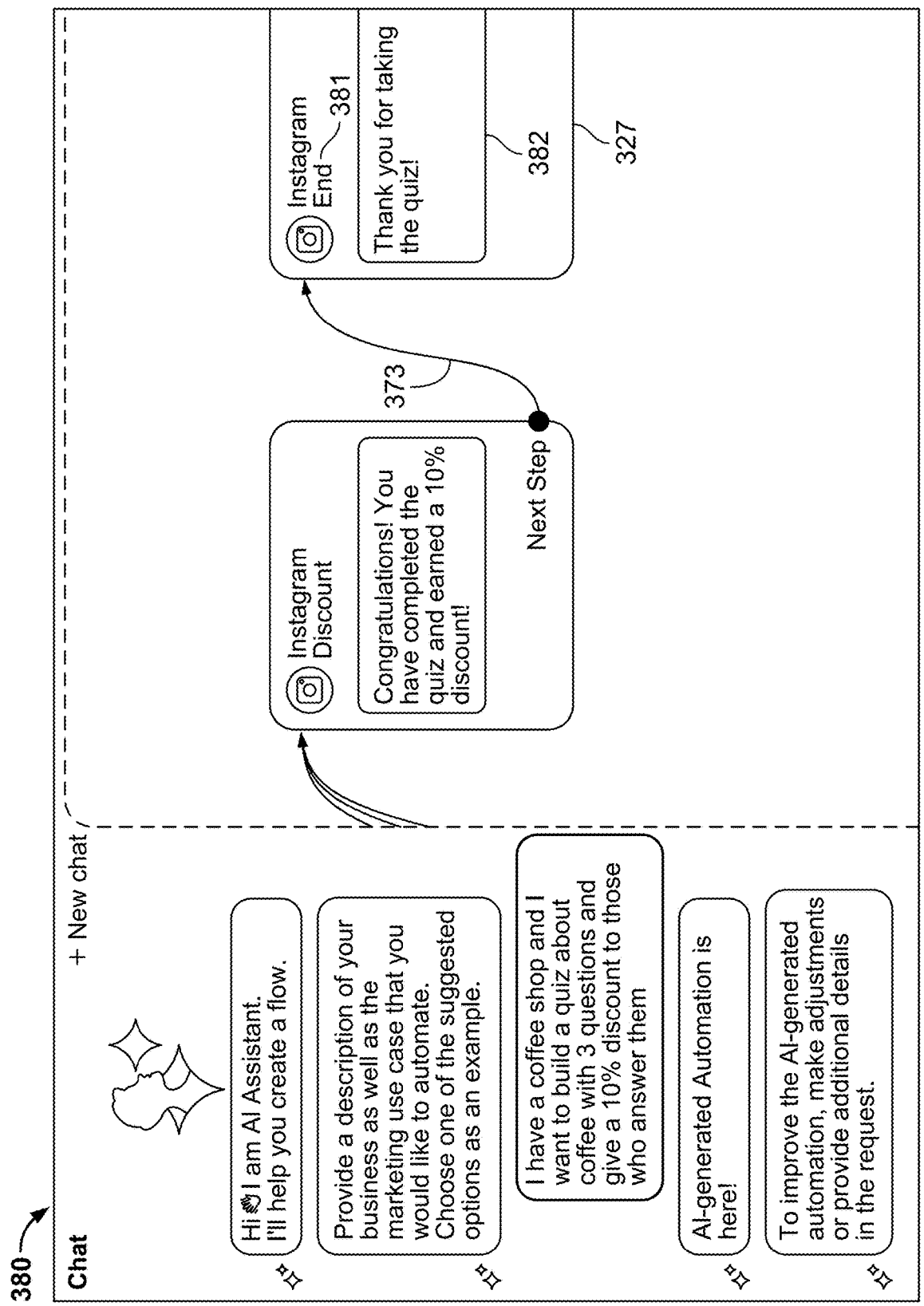

FIG. 3I is an example of a user interface in accordance with some embodiments. In the example shown, user interface 380 depicts content node 327. Content node 327 includes a title 381 and a message 382. Title 381 and message 382 are generated based on user response 316 and a prompt template selected based on an analysis of user response 316.

Figure 4:
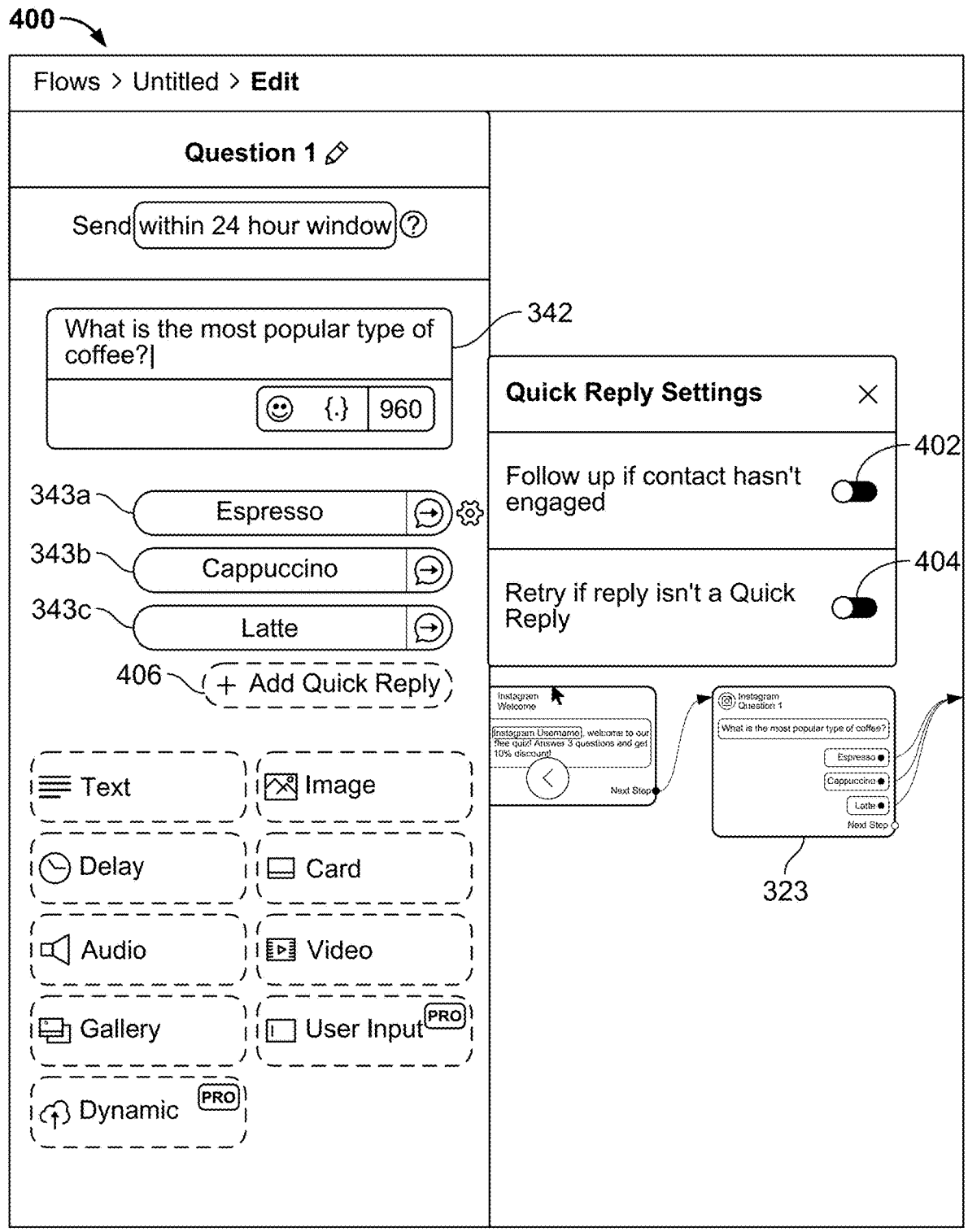
FIG. 4 is an example of a user interface in accordance with some embodiments.

FIG. 4 is an example of a user interface in accordance with some embodiments. User interface 400 provides a user with the ability to modify a content node. In the example shown, user interface 400 has received a selection of content node 323. A user may modify the message 342 via user interface 400. A user may modify the settings associated with reply 343a, reply 343b, or reply 343c. The user may turn on or turn off a setting associated with a reply, such as settings 402, 404. User 400 provides the user with the ability to add one or more additional replies 406.

User interface 400 enables a user to customize content card 323. For example, the user may add additional text, an image, a delay, a card, audio, video, a gallery, user input, or a dynamic input.

Figure 7A:
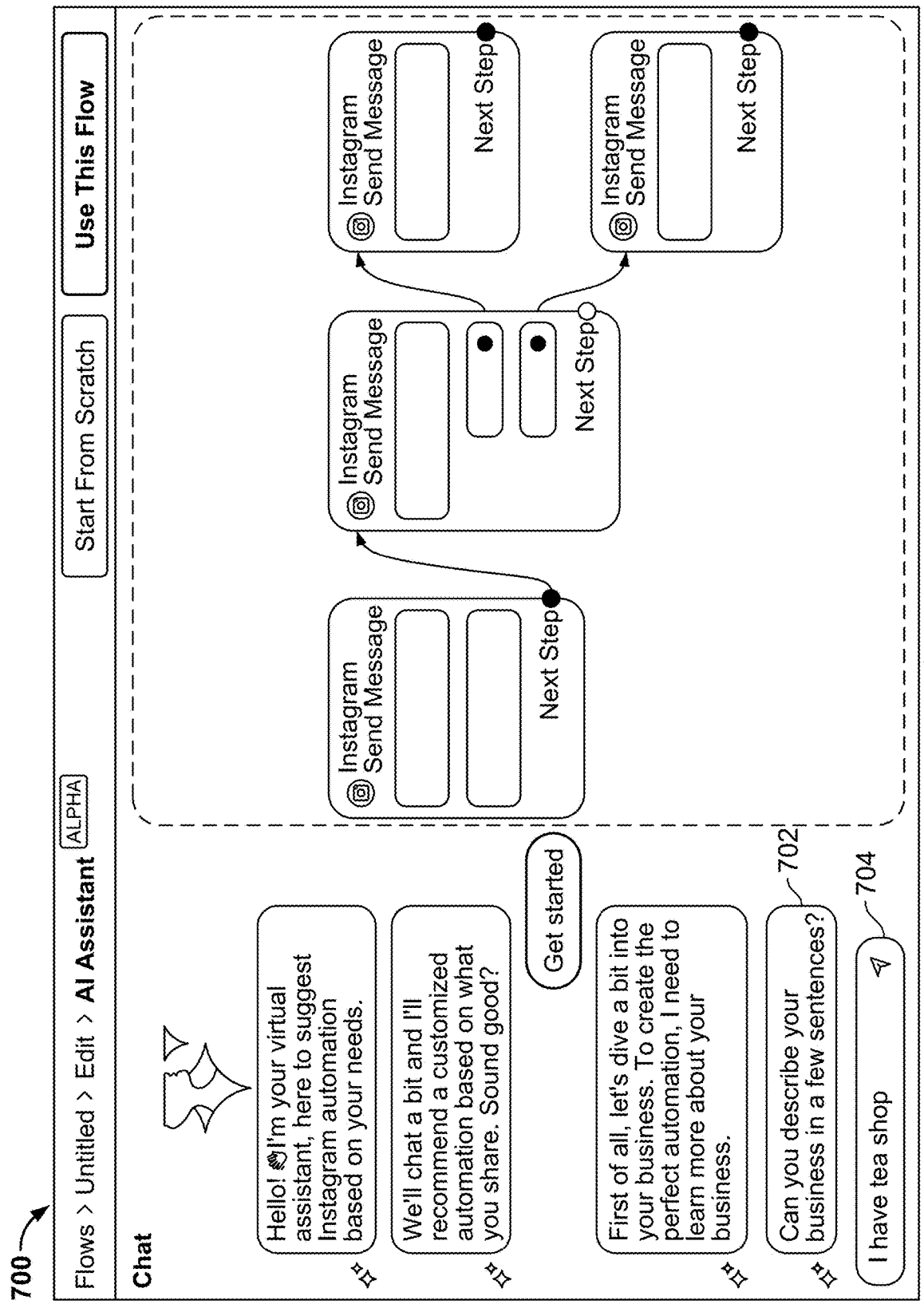
FIGS. 7A-7C are examples of a user interface in accordance with some embodiments.

FIG. 7A is an example of a user interface in accordance with some embodiments. In the example shown, user interface 700 includes a chatbot interface that enables an AI assistant to communicate with a user. The AI assistant is configured to generate the automated communication flow based on a series of questions and responses provided by the user. The AI assistant has provided message 702 to the user via user interface 700. In response, the user has provided user response 704 ("I have a tea shop"), which indicates a type of business associated with the user.

Figure 7B:
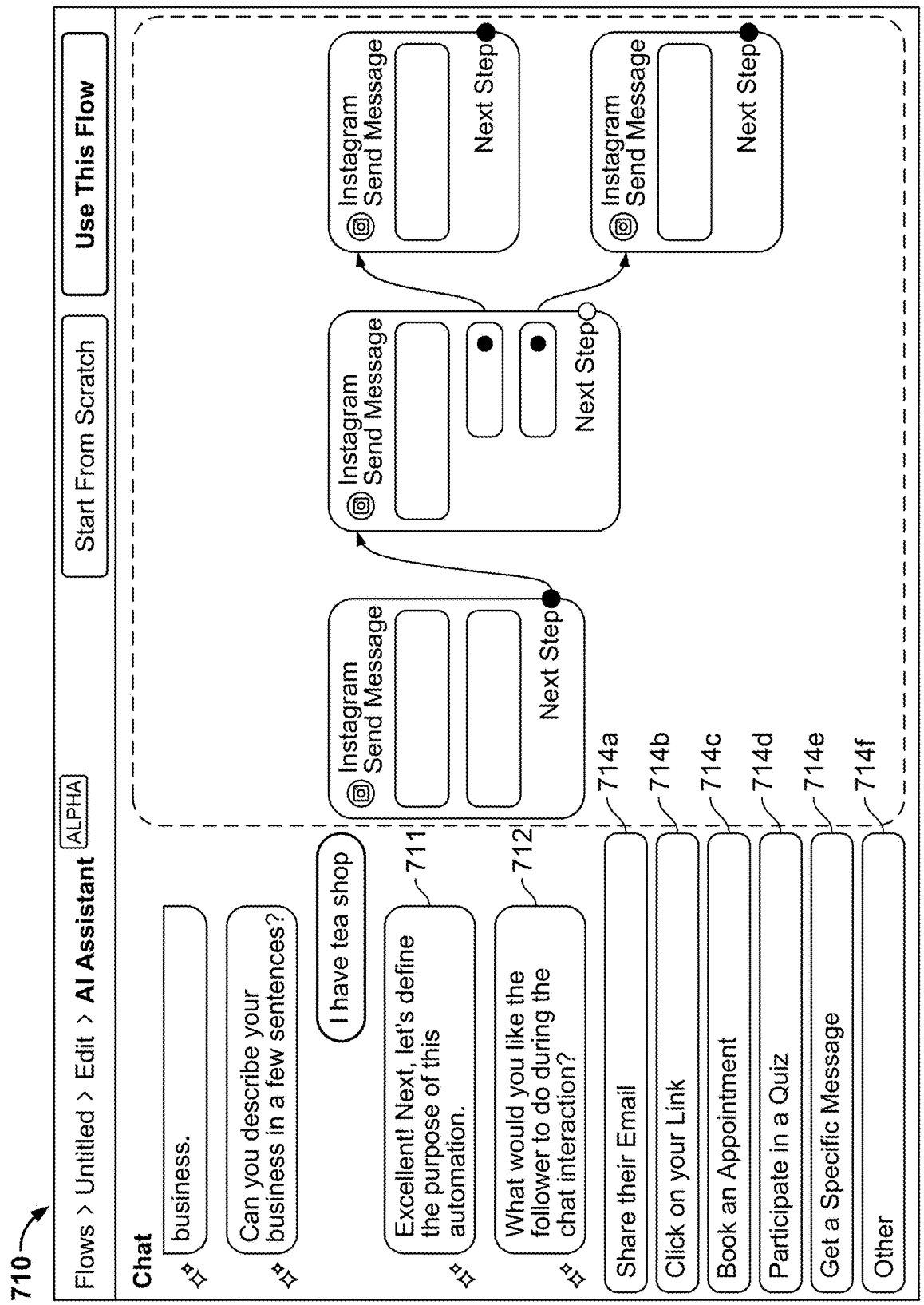

FIG. 7B is an example of a user interface in accordance with some embodiments. In the example shown, user interface 710 depicts a continuation of a conversation between the AI assistant and a user from FIG. 7A. The AI assistant has provided message 711 ("Excellent! Next, let's define the purpose of the automation.") and message 712 ("What would you like the follower to do during the chat interaction?") to the user via user interface 710. User interface 710 provides a plurality of response options 714a, 714b, 714c, 714d, 714e, 714f for the user.

Figure 7C:
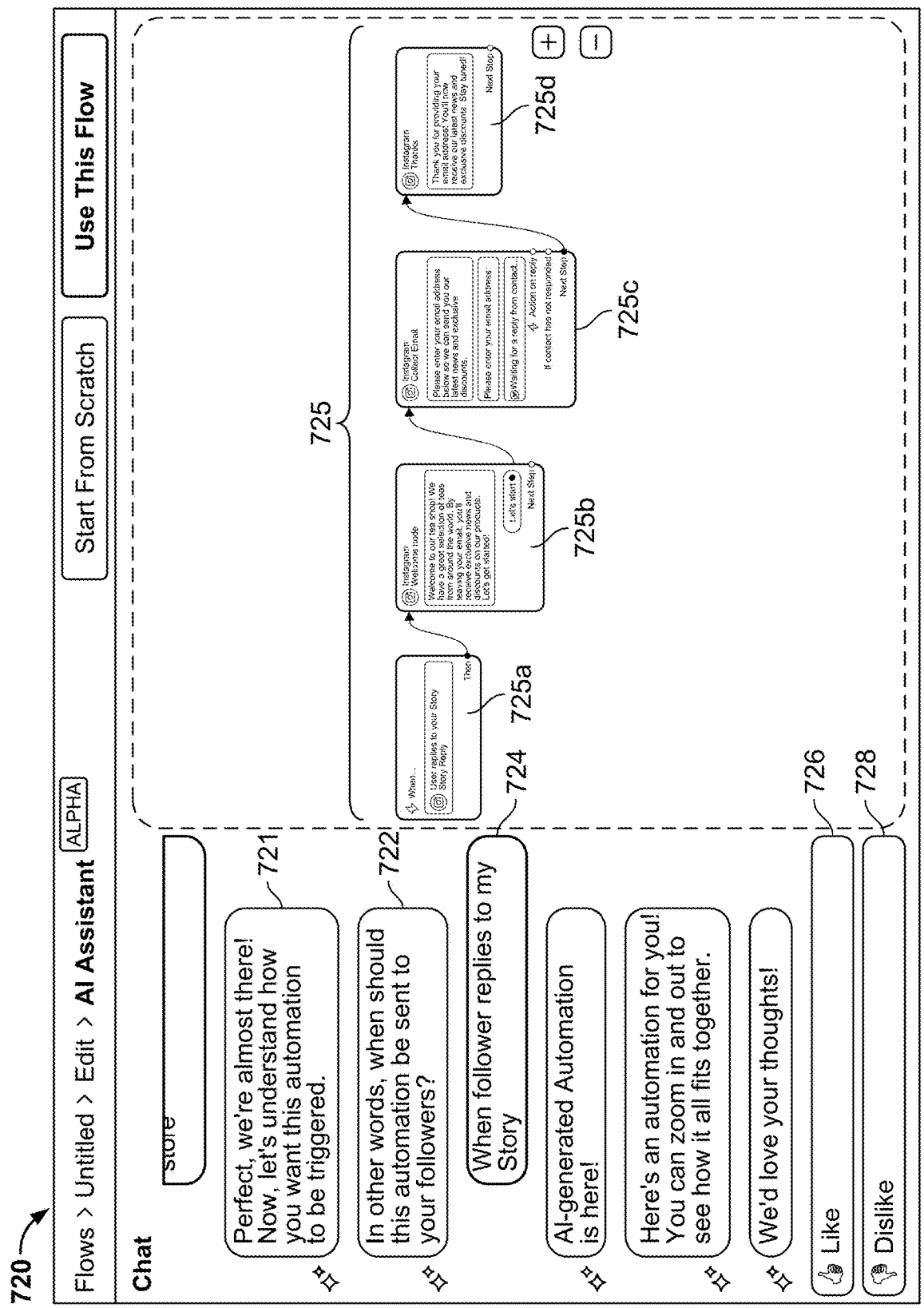

FIG. 7C is an example of a user interface in accordance with some embodiments. In the example shown, user interface 720 depicts a continuation of a conversation between the AI assistant and a user from FIG. 7B. The AI assistant has provided message 721 ("Perfect, we're almost there! Now, let's understand how you want this automation to be triggered.") and message 722 ("In other words, when should this automation be sent to your followers?") to the user via user interface 710. In response, the user has provided user response 724 ("When follower replies to my Story"), which indicates a trigger for the automated communication flow. An automated communication flow 725 is depicted in user interface 720. A user may provide feedback regarding the automated communication flow 725 via feedback input button 726 ("Like") or feedback input button 728 ("Dislike").

FIG. 7D is an example of a user request in accordance with some embodiments. In the example shown, user request 730 is based on the user responses 704, 714a, 724.

FIG. 7E is an example of a prompt in accordance with some embodiments. In the example shown, prompt 740 is based on prompt 600 and user response 704.

FIG. 7F is an example of a large language model output in accordance with some embodiments. In the example shown, large language model output 750 is outputted by a large language mode based on prompt 740.

FIG. 7G is an example of a post-processed large language model output in accordance with some embodiments. In the example shown, post-processed large language model output 760 is generated by an automated communication flow generator.

Figure 7H:
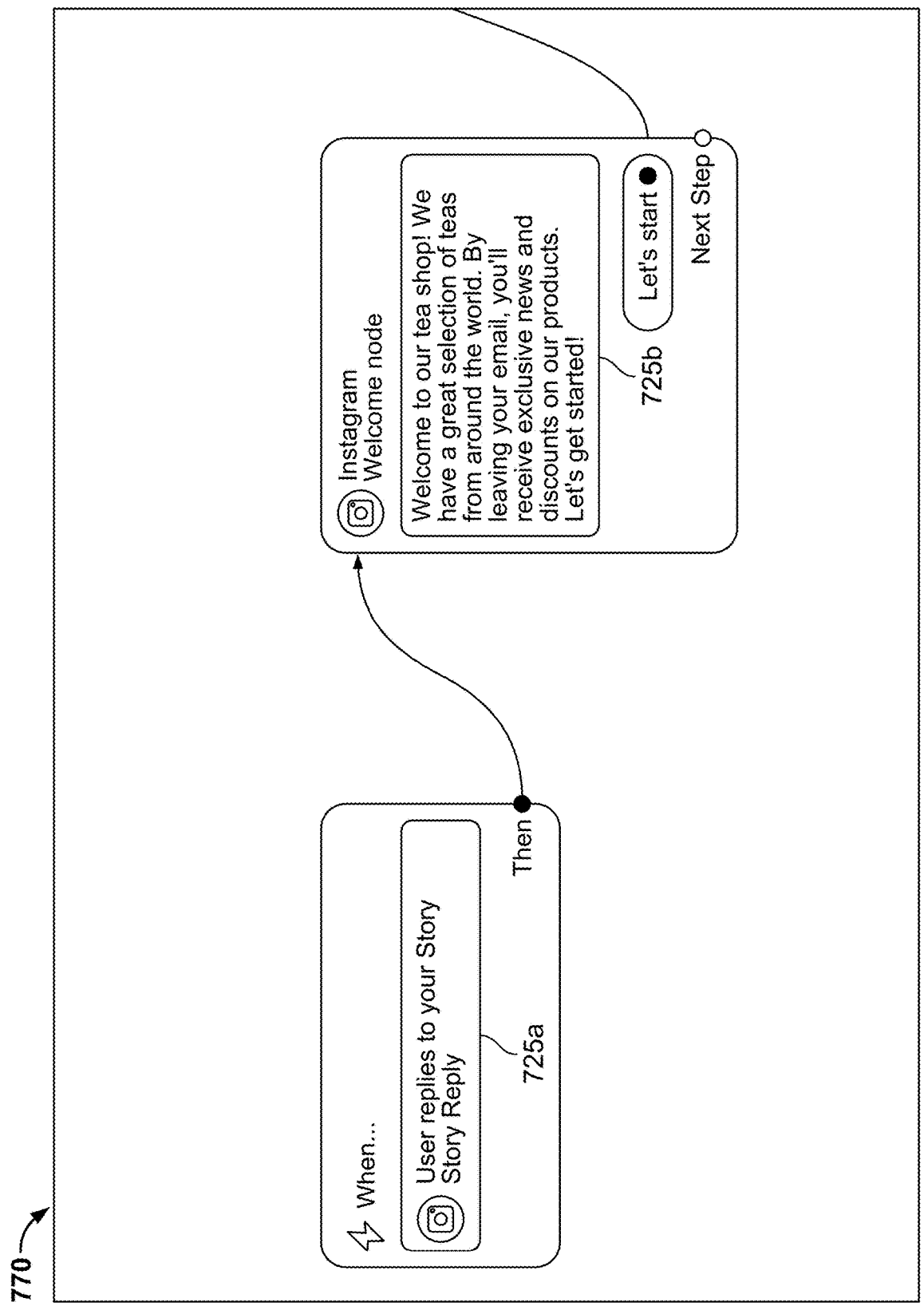
FIG. 7H is an example of an automated communication flow for a communication channel in accordance with some embodiments.
Figure 7H:
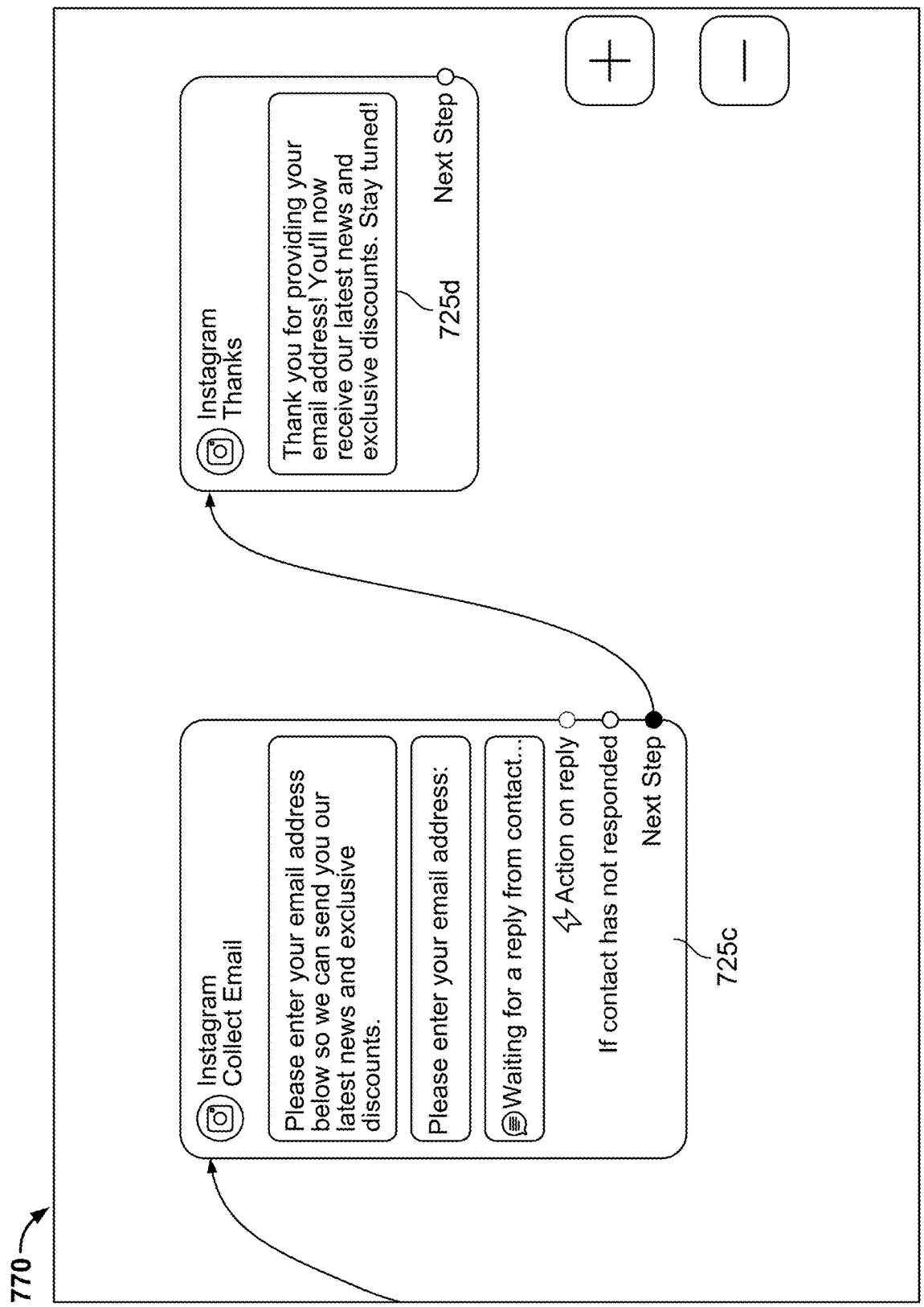

FIG. 7H is an example of an automated communication flow in accordance with some embodiments. In the example shown, the automated communication flow 770 is generated by an automated communication flow generator based on the post-processed large language model output 760. Automated communication flow 770 includes a first content node 725a, a second content node 725b, a third content node 725c, and a fourth content node 725d.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a natural language description of a desired function to be achieved using an automated communication flow;
   selecting a prompt template specifically for a communication channel based on an analysis of the natural language description of the desired function to be achieved;
   automatically generating a prompt for a large language model based on the natural language description, including by inserting at least a portion of the selected prompt template in the automatically generated prompt;
   providing the automatically generated prompt to the large language model; and
   based on an output of the large language model, automatically generating the automated communication flow to be implemented for the communication channel.

2. The method of claim 1, wherein the communication channel is selected via a user interface.

3. The method of claim 2, wherein the selected communication channel is selected among a plurality of different communication channel options via a drop down menu associated with the user interface.

4. The method of claim 1, wherein the natural language description of the desired function to be achieved indicates a type of automated communication flow to be generated.

5. The method of claim 4, wherein the type of automated communication flow to be generated is an email collection flow, a link to site flow, an appointment booking flow, a quiz flow, or a specific message flow.

6. The method of claim 1, wherein performing the analysis of the natural language description of the desired function to be achieved includes performing natural language processing on the natural language description to determine a type of automated communication flow to be generated.

7. The method of claim 6, wherein the selected prompt template specifically for the communication channel corresponds to the determined automated communication flow type.

8. The method of claim 1, wherein the automated communication flow includes one or more content nodes.

9. The method of claim 8, wherein the selected prompt template indicates the one or more content nodes to be included in the automated communication flow.

10. The method of claim 9, wherein the selected prompt template includes at least one placeholder message for one of the one or more content nodes.

11. The method of claim 9, wherein for a first content node of the one or more content nodes, the selected prompt template includes at least one identifier of a second content node as a target identifier associated with the first content node.

12. The method of claim 11, wherein the prompt for the large language model includes at least one trigger for the automated communication flow.

13. The method of claim 9, wherein the selected prompt template indicates at least one reply message for one of the one or more content nodes.

14. The method of claim 13, wherein the selected prompt template indicates a placeholder title for the at least one reply message.

15. The method of claim 1, wherein the prompt for the large language model includes one or more examples of an automated communication flow format that match a type of the automated communication flow.

16. The method of claim 1, further comprising receiving the output of the large language model.

17. The method of claim 1, wherein the output of the large language model is a structure description of the automated communication flow.

18. The method of claim 17, wherein automatically generating the automated communication flow to be implemented for the communication channel includes validating the structure description of the automated communication flow.

19. A system, comprising:
a processor configured to:
receive a natural language description of a desired function to be achieved using an automated communication flow;
select a prompt template specifically for a communication channel based on an analysis of the natural language description of the desired function to be achieved;
automatically generate a prompt for a large language model based on the natural language description, including by inserting at least a portion of the selected prompt template in the automatically generated prompt;
provide the automatically generated prompt to the large language model; and
based on an output of the large language model, automatically generate the automated communication flow to be implemented for the communication channel; and
a memory coupled to the processor and configured to provide the processor with instructions.

20. A computer program product embodied in a non-transitory computer readable medium and comprising computer instructions for:
receiving a natural language description of a desired function to be achieved using an automated communication flow;
selecting a prompt template specifically for a communication channel based on an analysis of the natural language description of the desired function to be achieved;
automatically generating a prompt for a large language model based on the natural language description, including by inserting at least a portion of the selected prompt template in the automatically generated prompt;
providing the automatically generated prompt to the large language model; and
based on an output of the large language model, automatically generating the automated communication flow to be implemented for the communication channel.

* * * * *